US012443878B2

United States Patent
Ayyadevara et al.

(10) Patent No.: US 12,443,878 B2
(45) Date of Patent: Oct. 14, 2025

(54) REINFORCEMENT LEARNING MACHINE LEARNING MODELS FOR INTERVENTION RECOMMENDATION

(71) Applicant: Optum, Inc., Minnetonka, MN (US)

(72) Inventors: V Kishore Ayyadevara, Hyderabad (IN); Rohan Khilnani, Jaipur (IN); Swaroop S. Shekar, Mysore (IN); Raghav Bali, Delhi (IN); Joseph C. Cremaldi, Memphis, TN (US); Fritz T. Wilhelm, Irvine, CA (US); Vinod Burugupalli, Tampa, FL (US)

(73) Assignee: Optum, Inc., Minnetonka, MN (US)

( * ) Notice: Subject to any disclaimer, the term of this patent is extended or adjusted under 35 U.S.C. 154(b) by 831 days.

(21) Appl. No.: 17/650,573

(22) Filed: Feb. 10, 2022

(65) Prior Publication Data
US 2023/0252338 A1    Aug. 10, 2023

(51) Int. Cl.
*G06N 20/00* (2019.01)
(52) U.S. Cl.
CPC .................................. *G06N 20/00* (2019.01)
(58) Field of Classification Search
None
See application file for complete search history.

(56) References Cited

U.S. PATENT DOCUMENTS

| | | | |
|---|---|---|---|
| 7,813,944 B1 | 10/2010 | Luk et al. | |
| 10,642,957 B1 | 5/2020 | Pinsonneault et al. | |
| 10,650,380 B1 | 5/2020 | Harris, Sr. et al. | |
| 11,132,615 B2 | 9/2021 | Natarajan et al. | |
| 2014/0257832 A1 | 9/2014 | Hermiz et al. | |
| 2014/0297306 A1 | 10/2014 | Whiddon et al. | |
| 2015/0019238 A1 | 1/2015 | Felt | |
| 2015/0170306 A1 | 6/2015 | Harper | |
| 2016/0055315 A1 | 2/2016 | Abbott | |
| 2020/0051679 A1 | 2/2020 | Bostic et al. | |
| 2021/0133201 A1 | 5/2021 | Tribble et al. | |
| 2021/0287774 A1 | 9/2021 | Curtiss et al. | |
| 2021/0304892 A1 | 9/2021 | Zheng et al. | |

OTHER PUBLICATIONS

Ghani, Rayid, and Mohit Kumar. "Interactive learning for efficiently detecting errors in insurance claims." In Proceedings of the 17th ACM SIGKDD international conference on Knowledge discovery and data mining, pp. 325-333. 2011. (Year: 2011).*
Choi, Jung-Moon, Ji-Hyeok Kim, and Sung-Jun Kim. "Application of reinforcement learning in detecting fraudulent insurance claims." International Journal of Computer Science & Network Security 21, No. 9 (2021): 125-131. (Year: 2021).*

(Continued)

*Primary Examiner* — Incent Gonzales
(74) *Attorney, Agent, or Firm* — ALSTON & BID LLP

(57) ABSTRACT

Various embodiments of the present invention provide methods, apparatus, systems, computing devices, computing entities, and/or the like for performing intervention recommendation operations. Certain embodiments of the present invention utilize systems, methods, and computer program products that perform intervention recommendations by using at least one of reinforcement learning machine learning models and event scoring machine learning models.

20 Claims, 10 Drawing Sheets

(56) References Cited

OTHER PUBLICATIONS

Chandola, Varun, Arindam Banerjee, and Vipin Kumar. "Anomaly detection: A survey." ACM computing surveys (CSUR) 41, No. 3 (2009): 1-58. (Year: 2009).*

Wang, Shihan, Karlijn Sporrel, Herke van Hoof, Monique Simons, Rémi DD de Boer, Dick Ettema, Nicky Nibbeling, Marije Deutekom, and Ben Kröse. Reinforcement learning to send reminders at right moments in smartphone exercise applications. Int'l Journ. of Enviromental Research and Public Health. (Year: 2021).*

Herland, Matthew et al. "The Effects of Class Rarity on the Evaluation of Supervised Healthcare Fraud Detection Models," Journal of Big Data, vol. 6, No. 21, Dec. 2019, pp. 1-33, DOI: 10.1186/s40537-019-0181-8.

Kumar, Mohit et al. "Data Mining to Predict and Prevent Errors in Health Insurance Claims Processing," In Proceedings of the 16th ACM SIGKDD International Conference on Knowledge Discovery and Data Mining, Jul. 25, 2010, pp. 65-74, DOI: 10.1145/1835804.1835816.

Zafari, Babak et al. "Multicriteria Decision Frontiersfor Prescription Anomaly Detection Over Time," Journal of Applied Statistics, Jul. 31, 2021, pp. 1-30, DOI: 10.1080/02664763.2021.1959528.

\* cited by examiner

FIG. 5

Greedy Approach

| Pharmacy | Jan | | | Feb | | | ... | Aug | | | ... | Dec | | |
|---|---|---|---|---|---|---|---|---|---|---|---|---|---|---|
| | Onsite Risk | Desk Risk | Paid Amt | Onsite Risk | Desk Risk | Paid Amt | | Onsite Risk | Desk Risk | Paid Amt | | Onsite Risk | Desk Risk | Paid Amt |
| P1 | 0.45 | 0.5 | 1000 | 0.66 | 0.75 | 1500 | | 0.79 | 0.8 | 3000 | | 0.1 | 0.1 | 6000 |
| P2 | 0.3 | 0.6 | 2000 | 0.6 | 0.3 | 2000 | | 0.1 | 0.3 | 2100 | | 0.4 | 0.3 | 4000 |
| P3 | 0.8 | 0.7 | 2000 | 0.4 | 0.1 | 2500 | | 0.2 | 0.4 | 2500 | | 0.7 | 0.6 | 4000 |
| P4 | 0.8 | 0.3 | 4000 | 0.3 | 0.6 | 4500 | | 0.3 | 0.3 | 3000 | | 0.8 | 0.8 | 5000 |
| P5 | 0.5 | 0.1 | 9500 | 0.07 | 0.9 | 1000 | | 0.6 | 0.7 | 11000 | | 0.3 | 0.4 | 12000 |
| Total Recoup | | | 8,630 | | | | | | | | | | | |

FIG. 9

REINFORCEMENT LEARNING MACHINE LEARNING MODELS FOR INTERVENTION RECOMMENDATION

BACKGROUND

Various embodiments of the present invention address technical challenges related to performing predictive data analysis. Various embodiments of the present invention address the shortcomings of existing predictive data analysis systems and disclose various techniques for efficiently and reliably performing predictive data analysis operations.

BRIEF SUMMARY

In general, embodiments of the present invention provide methods, apparatus, systems, computing devices, computing entities, and/or the like for performing intervention recommendation operations. Certain embodiments of the present invention utilize systems, methods, and computer program products that perform intervention recommendations by using at least one of reinforcement learning machine learning models and event scoring machine learning models.

In accordance with one aspect, a method is provided. In one embodiment, the method comprises: identifying a group of input events, wherein: each input event is associated with an event category of a plurality of event categories, each input event is associated with a defined timestep of the plurality of defined timesteps, and each input event is associated with an event score set that is determined based at least in part on one or more input event features associated with the input event and using an event scoring machine learning model; for each category-timestep pair that is associated with a particular event category and a particular defined timestep, generating a temporal event category score based at least in part on event score sets for a subset of the group of input events that are associated with the particular event category and the particular defined timestep; generating the optimal intervention routine using an intervention recommendation reinforcement learning machine learning model, wherein: the optimal intervention routine is selected from a plurality of candidate intervention routines by the intervention recommendation reinforcement learning machine learning model via maximizing a candidate intervention routine reward measure and minimizing a candidate intervention routine loss measure, each candidate intervention routine assigns a unique m-sized subset of the plurality of event categories to each defined timestep, each candidate intervention routine is associated with a per-timestep reward measure for each defined timestep that is generated based at least in part on each temporal event category score that is associated with a first category-timestep pair that is associated with: (i) one of those event categories that are in the unique m-sized subset for the defined timestep; and (ii) the defined timestep, each candidate intervention routine is associated with a per-timestep loss measure for each defined timestep that is generated based at least in part on each temporal event category score that is associated with a second category-timestep pair that is associated with: (i) one of those event categories that are not in the unique m-sized subset for the defined timestep; and (ii) the defined timestep, the candidate intervention routine reward measure for a particular candidate intervention routine is generated based at least in part on each per-timestep reward measure for the particular candidate intervention routine, and the candidate intervention routine loss measure for a particular candidate intervention routine is generated based at least in part on each per-timestep loss measure for the particular candidate intervention routine; and performing one or more prediction-based actions based at least in part on the optimal intervention routine.

In accordance with another aspect, a computer program product is provided. The computer program product may comprise at least one computer-readable storage medium having computer-readable program code portions stored therein, the computer-readable program code portions comprising executable portions configured to: identify a group of input events, wherein: each input event is associated with an event category of a plurality of event categories, each input event is associated with a defined timestep of the plurality of defined timesteps, and each input event is associated with an event score set that is determined based at least in part on one or more input event features associated with the input event and using an event scoring machine learning model; for each category-timestep pair that is associated with a particular event category and a particular defined timestep, generate a temporal event category score based at least in part on event score sets for a subset of the group of input events that are associated with the particular event category and the particular defined timestep; generate the optimal intervention routine using an intervention recommendation reinforcement learning machine learning model, wherein: the optimal intervention routine is selected from a plurality of candidate intervention routines by the intervention recommendation reinforcement learning machine learning model via maximizing a candidate intervention routine reward measure and minimizing a candidate intervention routine loss measure, each candidate intervention routine assigns a unique m-sized subset of the plurality of event categories to each defined timestep, each candidate intervention routine is associated with a per-timestep reward measure for each defined timestep that is generated based at least in part on each temporal event category score that is associated with a first category-timestep pair that is associated with: (i) one of those event categories that are in the unique m-sized subset for the defined timestep; and (ii) the defined timestep, each candidate intervention routine is associated with a per-timestep loss measure for each defined timestep that is generated based at least in part on each temporal event category score that is associated with a second category-timestep pair that is associated with: (i) one of those event categories that are not in the unique m-sized subset for the defined timestep; and (ii) the defined timestep, the candidate intervention routine reward measure for a particular candidate intervention routine is generated based at least in part on each per-timestep reward measure for the particular candidate intervention routine, and the candidate intervention routine loss measure for a particular candidate intervention routine is generated based at least in part on each per-timestep loss measure for the particular candidate intervention routine; and perform one or more prediction-based actions based at least in part on the optimal intervention routine.

In accordance with yet another aspect, an apparatus comprising at least one processor and at least one memory including computer program code is provided. In one embodiment, the at least one memory and the computer program code may be configured to, with the processor, cause the apparatus to: identify a group of input events, wherein: each input event is associated with an event category of a plurality of event categories, each input event is associated with a defined timestep of the plurality of defined timesteps, and each input event is associated with an event score set that is determined based at least in part on one or more input event features associated with the input event and using an event scoring machine learning model; for each category-timestep pair that is associated with a particular event category and a particular defined timestep, generate a temporal event category score based at least in part on event score sets for a subset of the group of input events that are associated with the particular event category and the particular defined timestep; generate the optimal intervention routine using an intervention recommendation reinforcement learning machine learning model, wherein: the optimal intervention routine is selected from a plurality of candidate intervention routines by the intervention recommendation reinforcement learning machine learning model via maximizing a candidate intervention routine reward measure and minimizing a candidate intervention routine loss measure, each candidate intervention routine assigns a unique m-sized subset of the plurality of event categories to each defined timestep, each candidate intervention routine is associated with a per-timestep reward measure for each defined timestep that is generated based at least in part on each temporal event category score that is associated with a first category-timestep pair that is associated with: (i) one of those event categories that are in the unique m-sized subset for the defined timestep; and (ii) the defined timestep, each candidate intervention routine is associated with a per-timestep loss measure for each defined timestep that is generated based at least in part on each temporal event category score that is associated with a second category-timestep pair that is associated with: (i) one of those event categories that are not in the unique m-sized subset for the defined timestep; and (ii) the defined timestep, the candidate intervention routine reward measure for a particular candidate intervention routine is generated based at least in part on each per-timestep reward measure for the particular candidate intervention routine, and the candidate intervention routine loss measure for a particular candidate intervention routine is generated based at least in part on each per-timestep loss measure for the particular candidate intervention routine; and perform one or more prediction-based actions based at least in part on the optimal intervention routine.

BRIEF DESCRIPTION OF THE DRAWINGS

Figure 1:
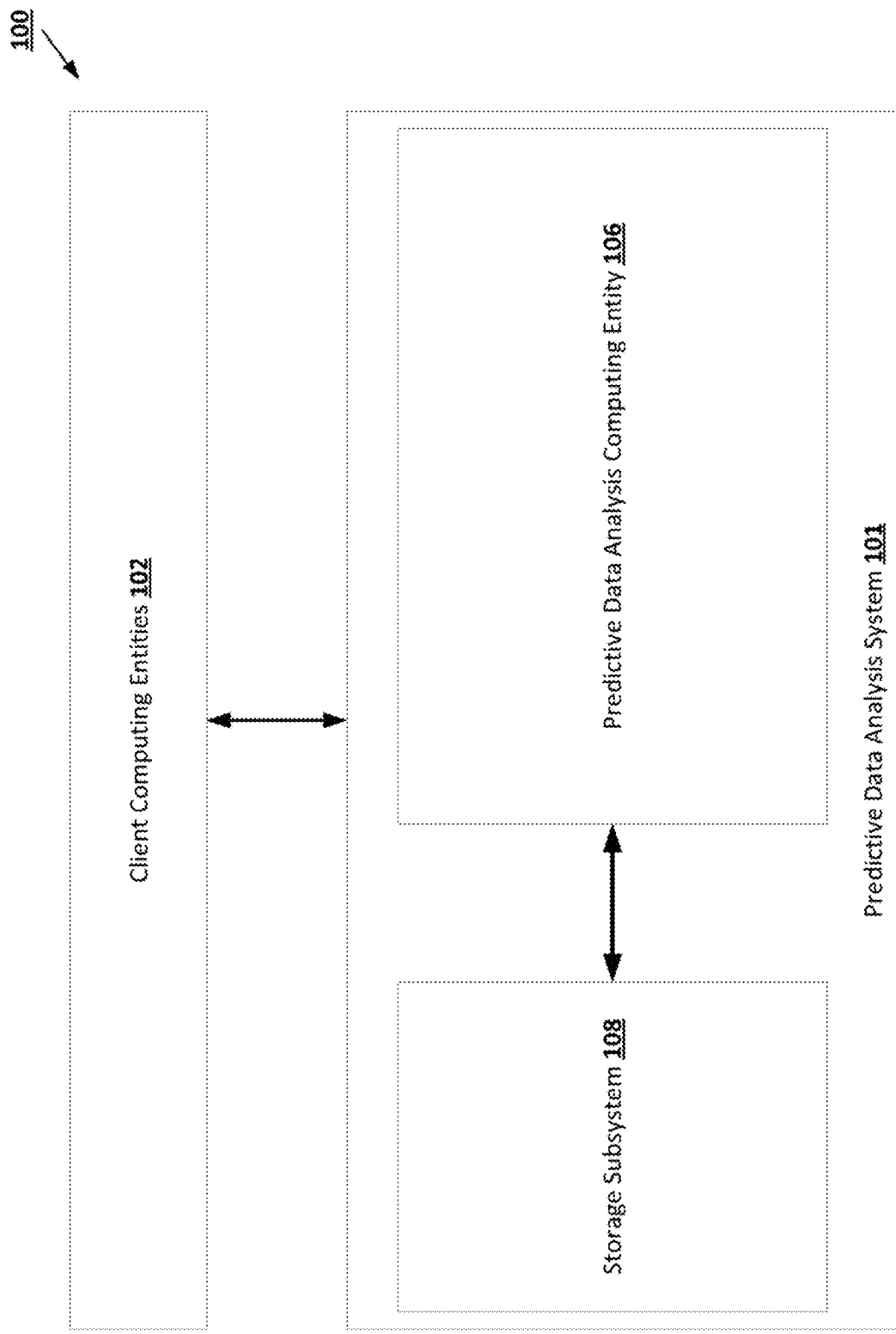

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
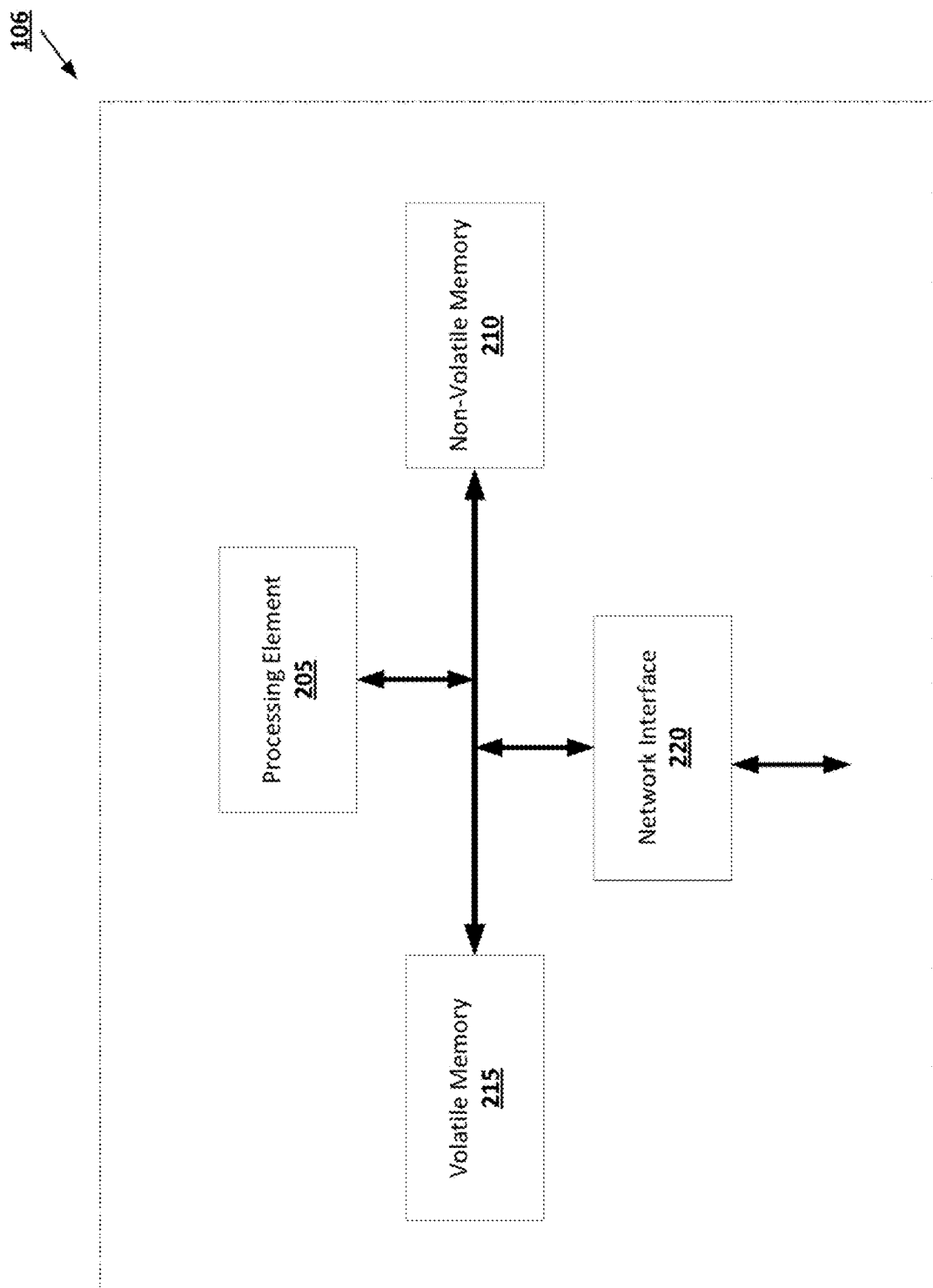

FIG. 2 provides an example predictive data analysis computing entity in accordance with some embodiments discussed herein.

Figure 3:
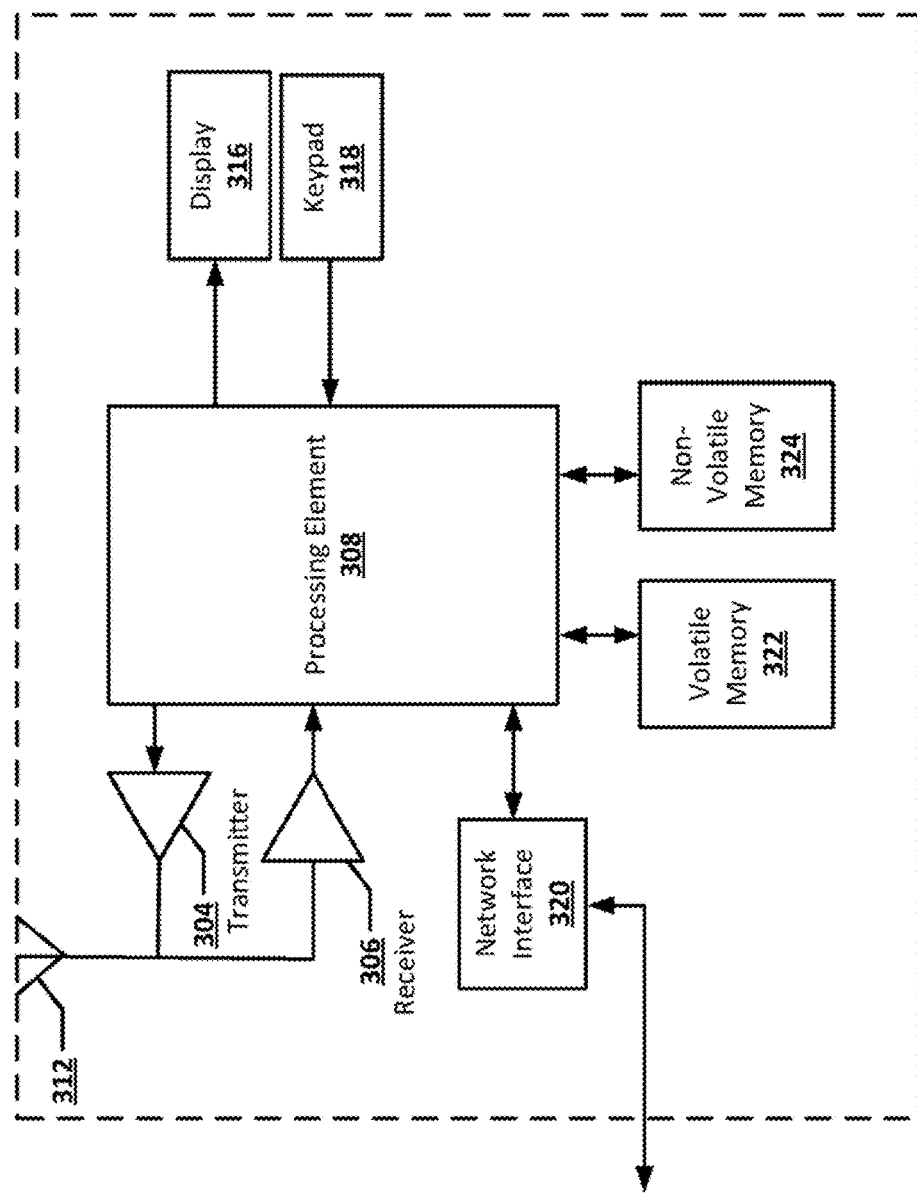

FIG. 3 provides an example external computing entity in accordance with some embodiments discussed herein.

Figure 4:
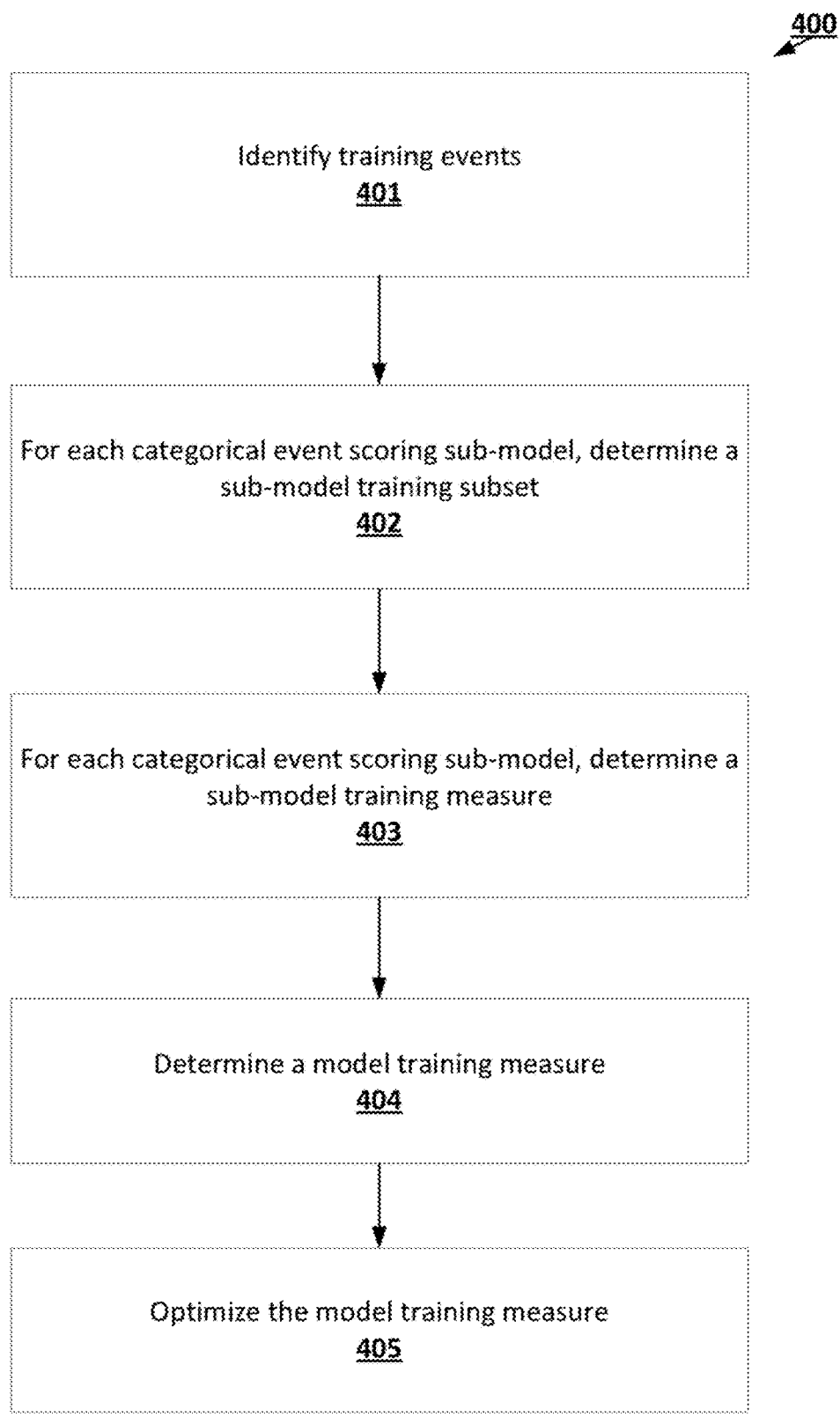

FIG. 4 is a data flow diagram of an example process for generating an event scoring machine learning model in accordance with some embodiments discussed herein.

Figure 5:
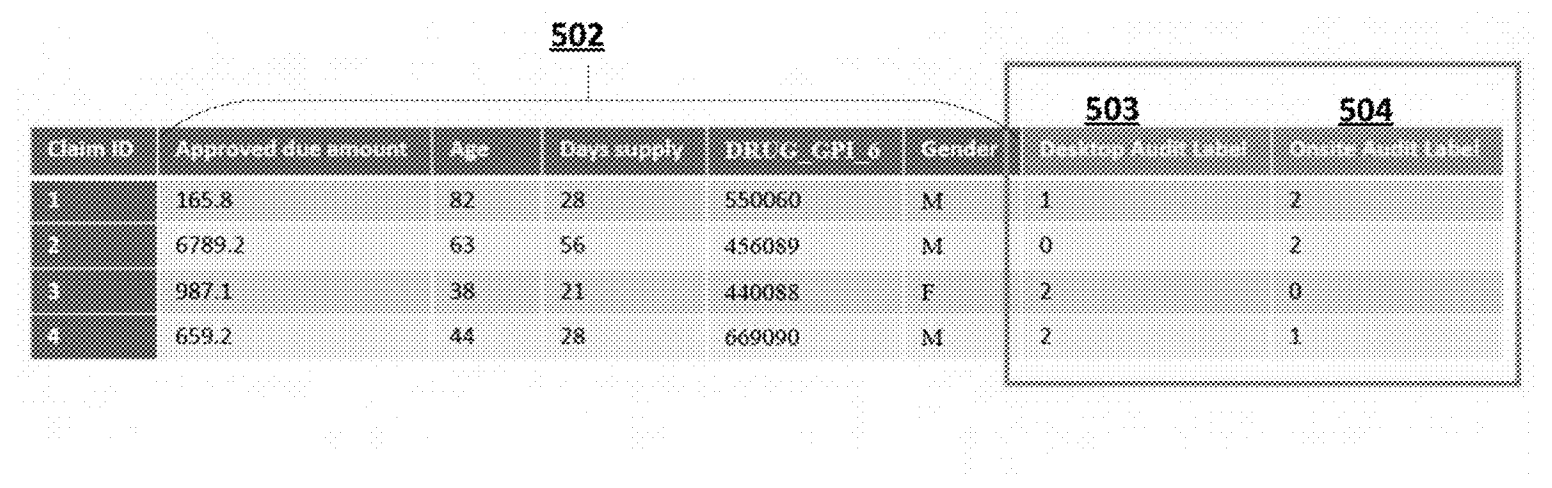

FIG. 5 provides an operational example of a set of training events in accordance with some embodiments discussed herein.

Figure 6:
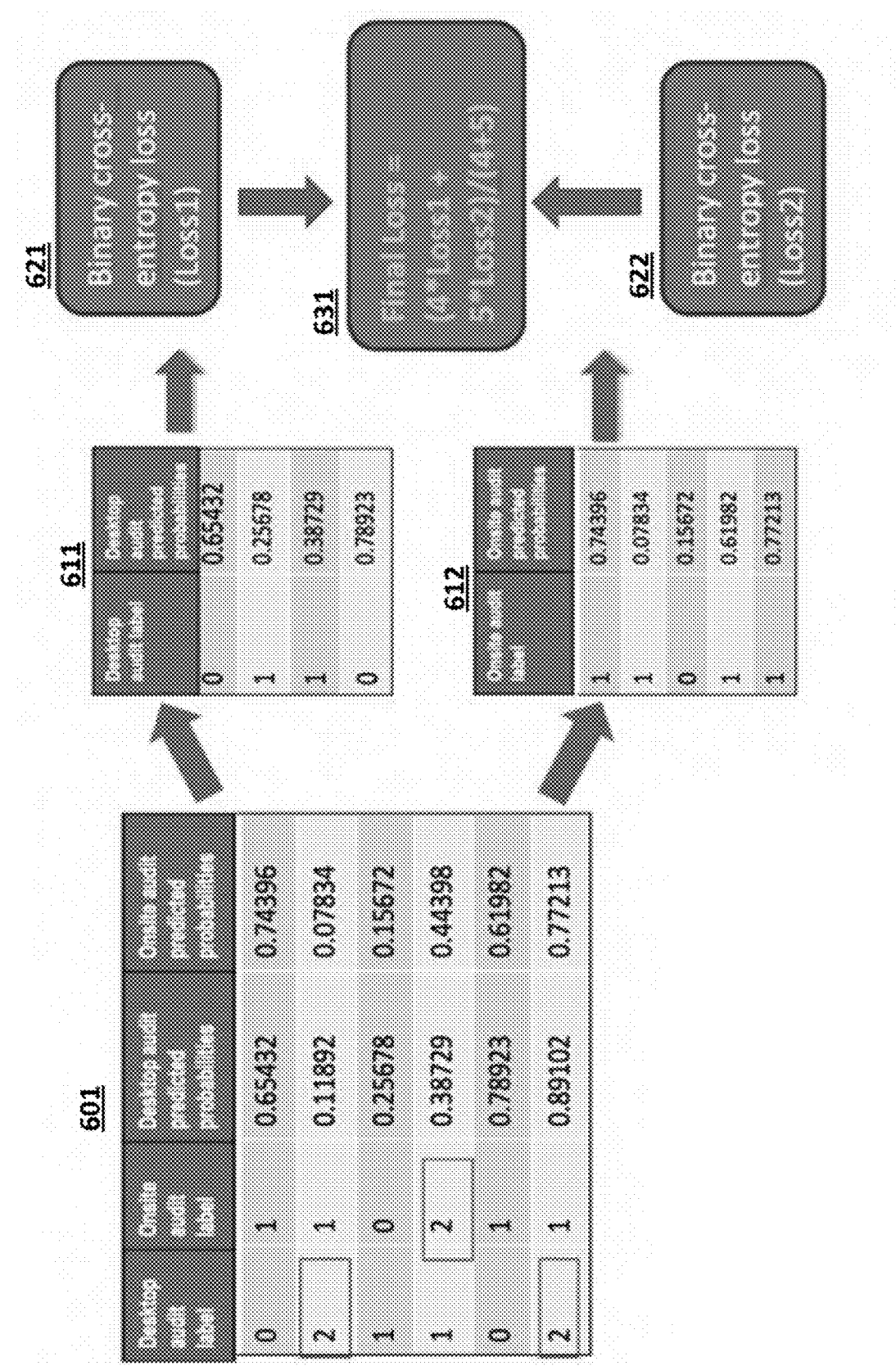

FIG. 6 provides an operational example of generating a model training measure for an event scoring machine learning model in accordance with some embodiments discussed herein.

Figure 7:
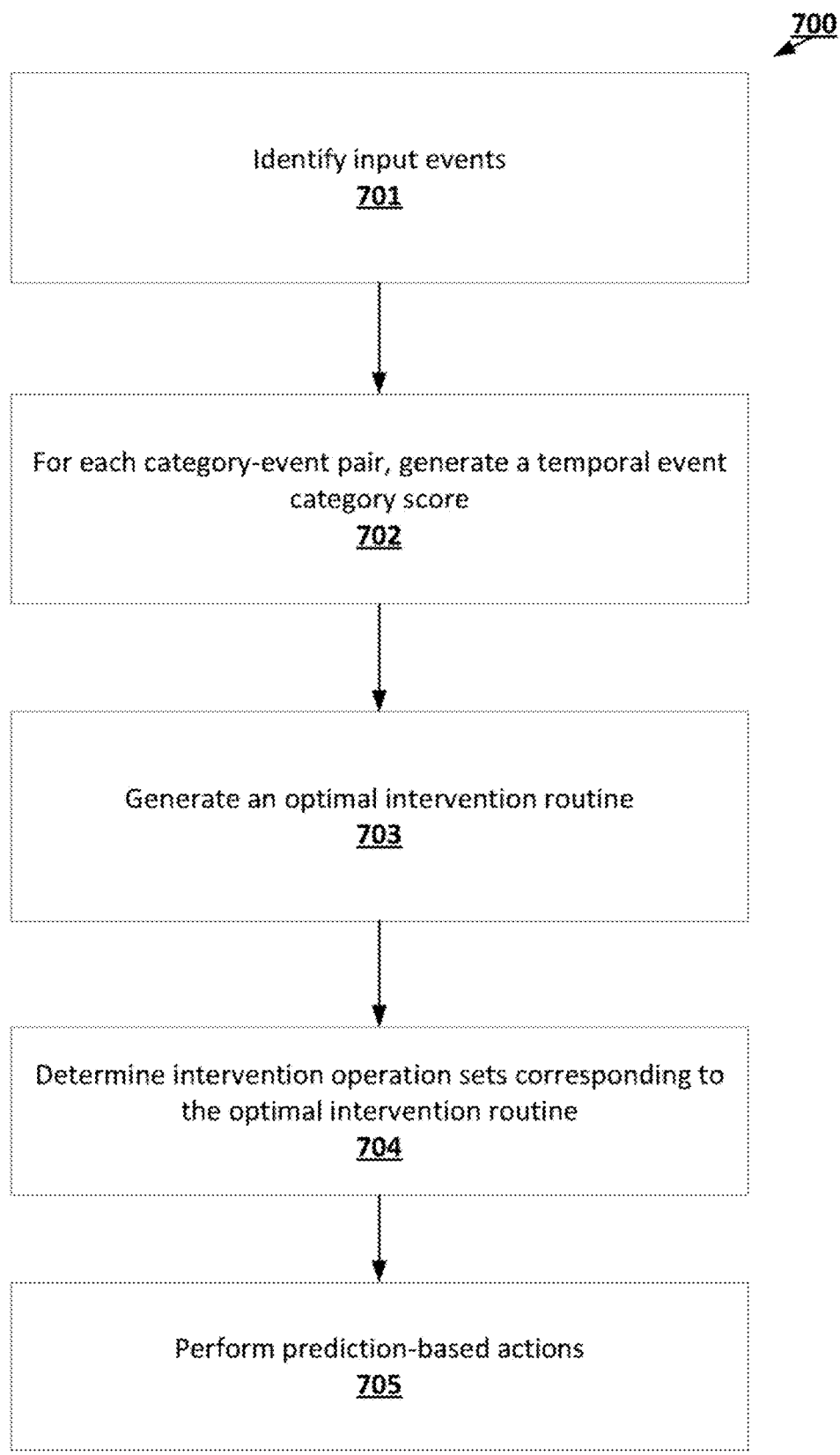

FIG. 7 is a flowchart diagram of an example process for generating an optimal intervention routine given a set of input events in accordance with some embodiments discussed herein.

Figure 8:
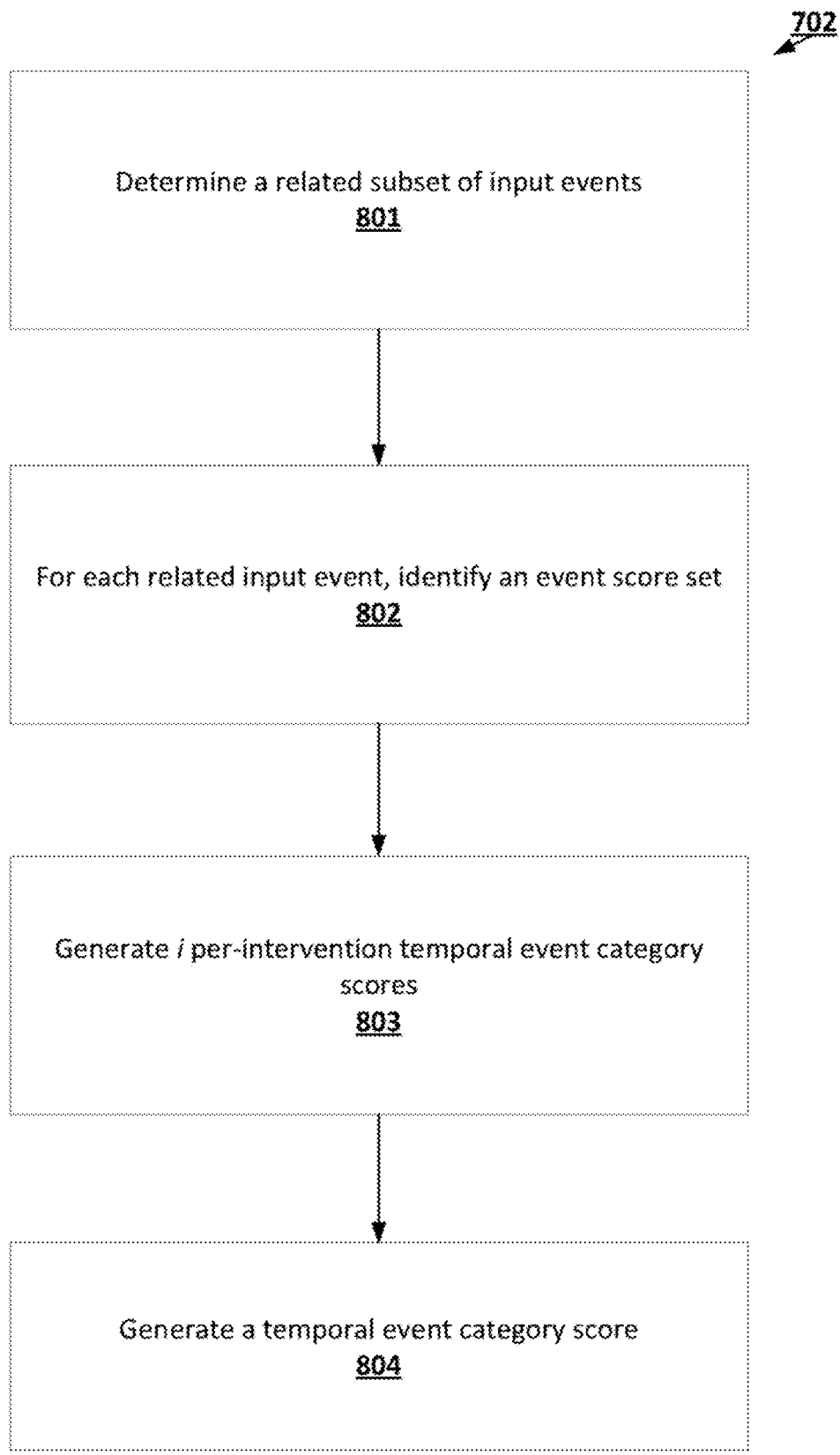

FIG. 8 is a flowchart diagram of an example process for generating a temporal event category score for a category-timestep pair in accordance with some embodiments discussed herein.

FIG. 9 provides an operational example of a set of per-intervention temporal event category scores in accordance with some embodiments discussed herein.

Figure 10:
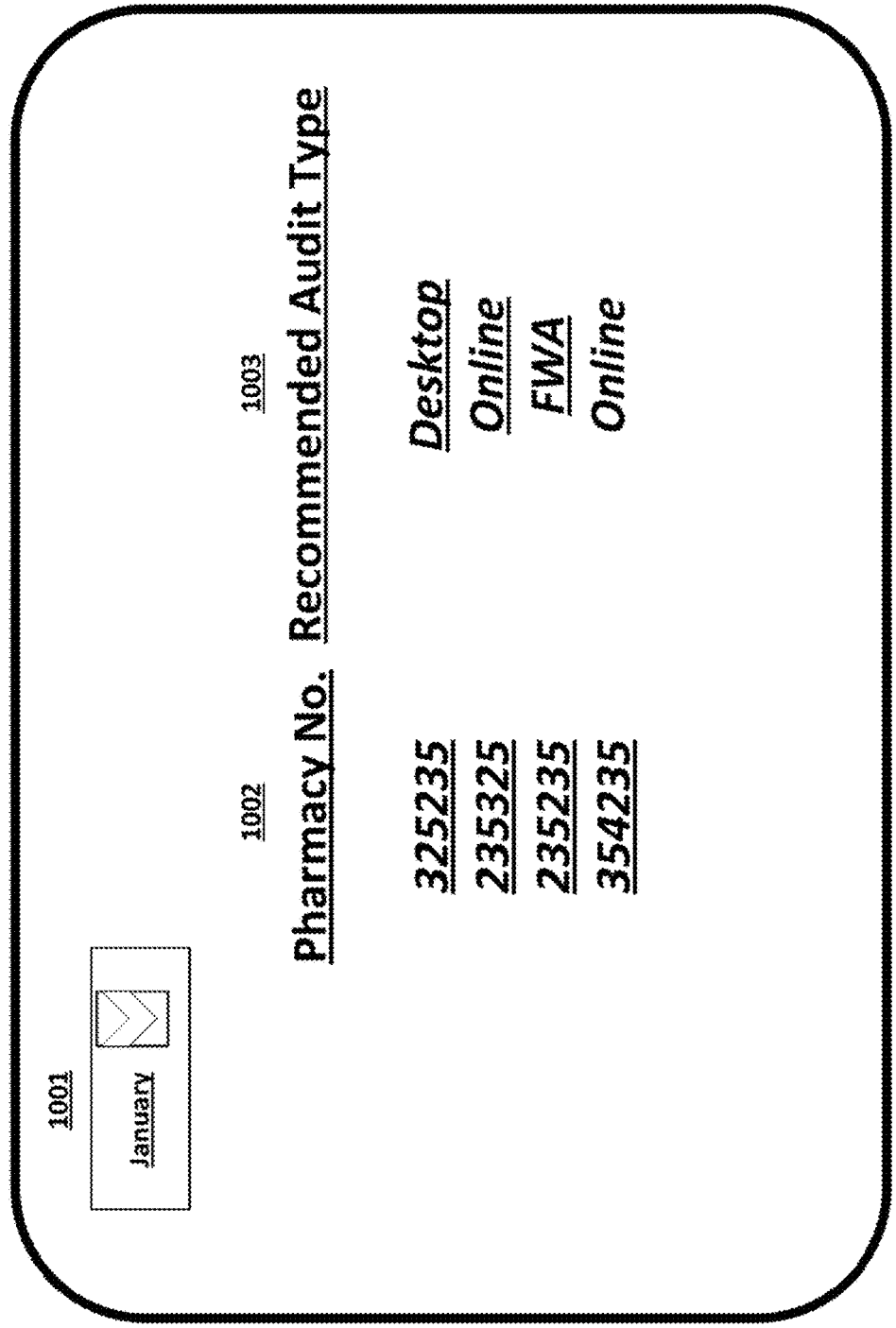

FIG. 10 provides an operational example of a prediction output user interface in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW AND TECHNICAL ADVANTAGES

Various embodiments of the present invention address technical challenges related to efficiently performing exploration-exploitation traversal of an input space by using operations having a linear computational complexity. As described below, in some embodiments, because a candidate intervention routine assigns a unique set of m event categories to each defined timestep, this ensures that different sets of event categories are selected for intervention during different timesteps (e.g., different sets of pharmacies are selected for audit during different months), which in turn ensures that a degree of exploration of the set of c event categories is enforced in determining optimal intervention routines, which helps enforce an exploration-exploitation traversal of the c event categories across the d defined timesteps. In this way, various embodiments of the present invention are able to enable a reinforcement machine learning model to perform exploration-exploitation traversal of an input space by using assignment/mapping operations having a linear computational complexity. In this way, various embodiments of the present invention improve the computational efficiency of performing reinforcement machine learning.

An exemplary application of various embodiments of the present invention relates to predicting discrepancies in pharmacy claims associated with a pharmaceutical entity with respect to different audit types and to determining an overall audit type to assign to the pharmaceutical entity. A single model is trained using a weighted average loss function to predict discrepancies with respect to multiple audit types in one shot. According to predicted discrepancy probabilities for each pharmacy claim with respect to different audit types and the claim cost for each pharmacy claim, an audit type is selected and assigned to the pharmaceutical entity. A key benefit of the Multi-Audit Recommendations concept is scalability; that is, as more audit types are added, the single model can still be applied (and re-trained), and the need for one model for each audit type is precluded. Another key benefit is the automation of audit type selection for a pharmaceutical entity, which conserves time and resources.

In some embodiments, the following operations are performed: configuring each of a plurality of training pharmacy claims with a ternary label for each of a plurality of audit type, the ternary label describing whether a training pharmacy claim was discrepant or evaluated for a corresponding audit type; training a discrepancy machine learning model using the plurality of training pharmacy claims and a weighted average loss function over the plurality of audit types, the discrepancy machine learning model trained to output a predicted discrepancy probability for a given pharmacy claim with respect to each of the plurality of audit types; providing a plurality of pharmacy claims associated with a pharmaceutical entity to the discrepancy machine learning model to obtain a predicted discrepancy probability with respect to each audit type for each pharmacy claim; and selecting and assigning a particular audit type to the pharmaceutical entity based at least in part on the predicted discrepancy probabilities with respect to the particular audit type for the plurality of pharmacy claims and a claim cost associated with each pharmacy claim.

In some embodiments, a pharmacy claim may undergo various different audits after being submitted, each audit type investigating different aspects of the pharmacy claim to uncover potential discrepancies. For example, a real-time audit may investigate data-related issues with claims and flag claim that have issues with basic details. Similarly, predictive fraud, waste, & abuse (FWA) audits look for patterns associated with fraud, waste, and abuse in pharmacy claims. In various embodiments, a single model is trained and used to evaluate a pharmacy claim with respect to multiple audit types in one shot, or at the same time. In order for the single model to be used for evaluating pharmacy claims with respect to multiple audit types, the single model is trained using training pharmacy claims each labelled according to whether the pharmacy claims are discrepant with respect to each audit type. For instance, a given training pharmacy claim may be labelled as discrepant for a first audit type, while being discrepant for a second audit type. Further, some training pharmacy claims may have only been historically evaluated with respect to some audit types, and as such, a training pharmacy claim may be labelled as irrelevant or unknown for other audit types. Thus, each training pharmacy claim may be configured with a ternary label for each audit type. For an audit type, the ternary label may have the value {0} if the claim was not discrepant, {1} if the claim was discrepant, and {2} if the claim was not evaluated for the audit type. The below figure shows four claims that have been configured with ternary labels for two audit types. According to the labels, the first two claims were only evaluated for a first audit type (due to the {2} labels for the second audit type) and the last two claims were only evaluated for a second audit type (due to the {2} labels for the first audit type).

Upon preparation of the training pharmacy claims, a discrepancy machine learning model can be trained. Specifically, the discrepancy machine learning model is configured to predict whether a claim is discrepant with respect to each audit type and specifically outputs a predicted discrepancy probability for the claim with respect to each audit type. That is, a predicted discrepancy probability determined for a claim represents the likelihood that the claim would turn up discrepant during a particular audit type. The discrepancy machine learning model makes such predictions using claim data, including approved due amount, gender, age, drug, information, paid amount, days' supply, and/or the like. In some aspects, the discrepancy machine learning model specifically includes a neural network. The ternary label configured for each training pharmacy claim is then used to determine a loss to apply and backpropagate for the discrepancy machine learning model. In various aspects of the Multi-Audit Recommendation, a weighted average loss function is used to first calculate audit-specific losses (for a particular audit type, using claims without a {2} label for the particular audit type) and then to determine a final loss, as is shown in the below figure. The final loss may then be used to backpropagate through the discrepancy machine learning model. As such, the discrepancy machine learning model can be trained to predict discrepancies for multiple audit types through the loss function over the multiple audit types, without needing to train an individual model for each audit type.

With the trained discrepancy machine learning model, a plurality of pharmacy claims associated with a particular pharmaceutical entity can be evaluated. Specifically, the plurality of pharmacy claims associated with the pharmaceutical entity may be provided to the discrepancy machine learning model such that each pharmacy claim is associated with a predicted discrepancy probability for each audit type. In the above figure, for example, each claim (a row in the table) has a predicted discrepancy probability for a first audit type and a predicted discrepancy probability for a second audit type. By providing the plurality of pharmacy claims to the trained discrepancy machine learning model, discrepancies for the claims across all audit types can be predicted in one shot using one model.

With the discrepancies across audit types being predicted for each claim, different audit types can then be compared for auditing the pharmaceutical entity. An overall score can be determined for each audit type, and based at least in part on said scores, an audit type can be selected and assigned to the pharmaceutical entity (whose claims were provided to the discrepancy machine learning model). Specifically, this selection of audit type may be based at least in part on an expected recouped amount. Each pharmacy claim associated with the particular pharmaceutical entity includes a paid amount. With the predicted discrepancy probability for each audit type, a given pharmacy claim can then have an expected recouped amount for each audit type, as shown in the below figure. The expected recouped amounts across the plurality of claims may be summed for each audit type, and the overall score for each audit type is based at least in part on this total expected recouped amount. Selection of an audit type, based at least in part on an expected recouped amount, then enables a pharmaceutical entity to be audited in order to maximize recouped payments.

II. DEFINITIONS

The term "training event" may refer to a data construct that describes a recorded event that is associated with a set of intervention labels for a set of intervention categories. Each training event may be associated with one or more training event features, a defined timestep of a plurality of defined timesteps (e.g., a defined month of 12 defined months), and a plurality of intervention labels for the plurality of intervention categories. An example of a training event is a data object that describes: one or more recorded features of a processed pharmacy claim as well as a set of intervention labels each describing whether the processed pharmacy claim has been subject to an audit having a corresponding audit type and, if so, the outcome of the noted audit. Examples of recorded features of a processed pharmacy claim include an approved due amount of the processed pharmacy claim, an age of a member associated with the processed pharmacy claim, a drug group of a drug/medication associated with the processed pharmacy claim, a number of supplied days of the processed pharmacy claim, a gender of the member associated with the processed pharmacy claim. Examples of intervention labels associated with a processed pharmacy claim include: an intervention label describing whether the processed pharmacy claim has been subject to a desktop audit, and, if so, the outcome of the desktop audit; an intervention label describing whether the processed pharmacy claim has been subject to an onsite audit, and, if so, the outcome of the onsite audit; and an intervention label describing whether the processed pharmacy claim has been subject to a Fraud, Waste, and Abuse (FWA) audit, and, if so, the outcome of the FWA audit, and/or the like.

The term "defined timestep" may refer to a data construct that describes a categorization of a period of time, such as a categorization of a recurring period of time. An example of a defined timestep is a defined timestep corresponding to a month of a year (e.g., to January). In some embodiments, given a set of i intervention categories, the event scoring machine learning model is configured to generate a set of i event scores for each recorded event (e.g., each input event, each training event, and/or the like). In some embodiments, given a set of i intervention categories, a predictive data analysis computing entity is configured to generate a set of i per-intervention temporal event category scores for each category-timestep pair that is associated with a particular event category and a particular defined timestep. For example, in some embodiments, when the set of event categories correspond to a set of pharmacies, and the set of defined timesteps correspond to a set of months, then the predictive data analysis computing entity may be configured to generate i per-intervention temporal event category scores for each pharmacy during each month. For example, for a pharmacy P1, the predictive data analysis computing entity may generate i per-intervention temporal event category scores for the pharmacy P1 with respect to the month of January, i per-intervention temporal event category scores for the pharmacy P1 with respect to the month of February, i per-intervention temporal event category scores for the pharmacy P1 with respect to the month of March, and so on.

The term "event category" may refer to a data construct that describes a defined subset of a set of events (e.g., a set of training events, a set of input events, and/or the like). For example, when a set of events describe a set of processed pharmacy claims that are associated with a set of pharmacies, then an event category may describe a subset of the set of processed pharmacy claims that are associated with a particular pharmacy in the set of pharmacies. As described above, a predictive data analysis computing entity may be configured to generate a set of per-intervention temporal event category scores for each category-timestep pair that describes a combination of a particular event category and a particular defined timestep. For example, for a pharmacy P1, the predictive data analysis computing entity may generate i per-intervention temporal event category scores for the pharmacy P1 with respect to the month of January, i per-intervention temporal event category scores for the pharmacy P1 with respect to the month of February, i per-intervention temporal event category scores for the pharmacy P1 with respect to the month of March, and so on.

The term "intervention category" may refer to a data construct that describes a set of automated operations and/or a set of manual operations that may be performed with respect to the recorded events of an event category. Examples of intervention categories describe various types of audits (e.g., onsite audits, desktop audits, FWA audits, and/or the like) that may be performed on processed pharmacy claims associated with a set of pharmacies. As described above, for each category-timestep pair that is associated with a particular event category (e.g., a particular pharmacy) and a particular defined timestep (e.g., a particular month of the year), a predictive data analysis computing entity may be configured to generate a set of per-intervention temporal event category scores each associated with an intervention category of a set of intervention categories. For example, given a set of intervention categories that comprise an onsite audit intervention category and a desktop audit intervention category, the predictive data analysis computing entity may generate, for each category-timestep pair that is associated with a particular pharmacy and a particular month of the year, two per-intervention temporal event category scores: a first per-intervention temporal event category score that describes a predicted recommendation score for performing operations corresponding to the onsite audit intervention category with respect to the recorded events of the particular pharmacy during the particular month, and a second per-intervention temporal event category score that describes a predicted recommendation score for performing operations corresponding to the desktop audit intervention category with respect to the recorded events of the particular pharmacy during the particular month.

The term "event scoring machine learning model" may refer to a data construct that describes parameters, hyper-parameters, and/or defined operations of a machine learning model that is configured to process input event features for an input event to generate an event score set for the input event, where the event score set for the input event may comprise i categorical event scores for the input event with respect to i intervention categories. In some embodiments, given a set of i intervention categories, the event scoring machine learning model comprises i categorical event scoring sub-models, where each categorical event scoring sub-model is configured to generate, for an input/training event, a categorical event score with respect to the intervention category that is associated with the categorical event scoring sub-model. For example, given a set of intervention categories that comprise a desktop audit intervention category and an online audit intervention category, the event scoring machine learning model may comprise two categorical event scoring sub-models: a first categorical event scoring sub-model that is configured to generate a categorical event score for an input/training event that describes a predicted/inferred likelihood that performing operations of the desktop audit intervention category with respect to the input/training event will generate an affirmative (e.g., a successful discrepancy/error detection) outcome, and a second categorical event scoring sub-model that is configured to generate a categorical event score for an input/training event that describes a predicted/inferred likelihood that performing operations of the online audit intervention category with respect to the input/training event will generate an affirmative (e.g., a successful discrepancy/error detection) outcome.

In some embodiments, inputs to the event scoring machine learning model comprise a vector including input feature vectors of an input event, while outputs of the event scoring machine learning model comprise a vector describing the i categorical event scores in the event score set of an input event.

The term "sub-model training measure" may refer to a data construct that describes, given a categorical event scoring sub-model that is associated with a sub-model training subset and a corresponding intervention category, a loss measure (e.g., a cross-entropy loss measure, a mean squared error loss measure, and/or the like) that describes, for each training event in the sub-model training subset for the categorical event scoring sub-model, a measure of deviation between an inferred categorical event score for the training event as determined via processing the training event features for the training event using the categorical event scoring sub-model and an intervention label for the training event with respect to the corresponding intervention category of the categorical event scoring sub-model. For example, consider a categorical event scoring sub-model that is configured to generate categorical event scores with respect to a desktop audit intervention category and is associated with two training events, where a first training event describes negative occurrence of the desktop audit intervention category with respect to a corresponding processed pharmacy claim and a second training event describes a negative occurrence of the desktop audit intervention category with respect to the corresponding processed pharmacy claim. In this example, if the categorical event scoring sub-model generates, during training, a categorical event score of $s_1$ for the first training event and via processing the training event features of the first training event, and further generates a categorical event score of $s_2$ for the second training event and via processing the training event features of the second training event, then the sub-model training measure for the exemplary categorical event scoring sub-model may be determined based at least in part on: (i) a deviation measure of $s_1$ and a value describing a negative occurrence intervention label (e.g., a value of zero); and (ii) a deviation measure of $s_2$ and a value describing an affirmative occurrence intervention label (e.g., a value of one). For example, in some embodiments, the sub-model training measure for the categorical event scoring sub-model may be generated based at least in part on the output of ($|0-s_1|^2+|1-s_2|^2$).

The term "model training measure" may refer to a data construct that describes a loss measure for an event scoring machine learning model that may be determined based at least in part on each sub-model training measure for a categorical event scoring sub-models of the event scoring machine learning model. In some embodiments, given an i categorical event scoring sub-models that are associated with i sub-model training measures, the i sub-model training measures may be combined to generate the model training measure. For example, combining the i sub-model training measures for i categorical event scoring sub-models of an event scoring machine learning model may be performed based at least in part on a tunable intervention significance parameter for each of the plurality of intervention categories. For example, in some embodiments, given i sub-model training measures for i categorical event scoring sub-models of an event scoring machine learning model, each sub-model training measure is adjusted based at least in part on a tunable (e.g., trained) intervention significance parameter of the intervention category that is associated with the corresponding categorical event scoring sub-model for the sub-model training measure to generate an adjusted sub-model training measure for the categorical event scoring sub-model, and then the i adjusted sub-model training measures for i the categorical event scoring sub-models of the event scoring machine learning model are combined/aggregated to generate the model training measure for the event scoring machine learning model. In some embodiments, given i categorical event scoring sub-models of an event scoring machine learning model, the model training measure for the event scoring machine learning model is determined based at least in part on the output of the equation $$\frac{w_1 \; loss_1 + \ldots + w_i \; loss_i}{w_1 + \ldots + w_i},$$

where each $w_j$ is the tunable intervention significance parameter for a jth intervention category that is associated with a jth categorical event scoring sub-model, each $loss_j$ is the sub-model training measure for the jth categorical event scoring sub-model, and each $w_j loss_j$ is the adjusted sub-model training measure for the jth categorical event scoring sub-model.

The term "per-intervention temporal event category score" may refer to a data construct that describes a predicted recommendation score for a corresponding intervention category with respect to a category-timestep pair associated with a particular event category and a particular timestep. In some embodiments, each per-intervention temporal event category score is associated with a particular intervention category of the i intervention categories and is determined by combining (e.g., averaging) the categorical event scores for the particular intervention category across all of the input events in the related subset for the particular category-timestep pair. In some embodiments, combining the categorical event scores for the particular intervention category across all of the input events in the related subset for the particular category-timestep pair comprises generating a statistical distribution measure (e.g., a mean, a median, a mode, and/or the like) of the particular intervention category across all of the input events in the related subset for the particular category-timestep pair and generating the per-intervention temporal event category score for the particular category-timestep pair and the particular intervention category based at least in part on the statistical distribution. In some embodiments, combining the categorical event scores for the particular intervention category across all of the input events in the related subset for the particular category-timestep pair comprises processing the categorical event scores for the particular intervention category across all of the input events in the related subset for the particular category-timestep pair using an event score aggregation machine learning model for the particular intervention category and generating the per-intervention temporal event category score for the particular category-timestep pair and the particular intervention category based at least in part on the model output of the noted processing.

The term "intervention recommendation reinforcement learning machine learning model" may refer to a data construct that describes parameters, hyperparameters, and/or defined operations of a machine learning model that is configured to select an optimal intervention routine from a set of candidate intervention routines. In some embodiments, the optimal intervention routine is selected from a plurality of candidate intervention routines by the intervention recommendation reinforcement learning machine learning model via maximizing a candidate intervention routine reward measure and minimizing a candidate intervention routine loss measure. In some embodiments, each candidate intervention routine assigns a unique m-sized subset of the plurality of event categories to each defined timestep, each candidate intervention routine is associated with a per-timestep reward measure for each defined timestep that is generated based at least in part on each temporal event category score that is associated with a first category-timestep pair that is associated with: (i) one of those event categories that are in the unique m-sized subset for the defined timestep; and (ii) the defined timestep, each candidate intervention routine is associated with a per-timestep loss measure for each defined timestep that is generated based at least in part on each temporal event category score that is associated with a second category-timestep pair that is associated with: (i) one of those event categories that are not in the unique m-sized subset for the defined timestep; and (ii) the defined timestep, the candidate intervention routine reward measure for a particular candidate intervention routine is generated based at least in part on each per-timestep reward measure for the particular candidate intervention routine, and the candidate intervention routine loss measure for a particular candidate intervention routine is generated based at least in part on each per-timestep loss measure for the particular candidate intervention routine. In some embodiments, maximizing the candidate intervention routine reward measure and minimizing the candidate intervention routine loss measure is performed using a dual optimization routine that enforces an exploration-exploitation traversal of the plurality of event categories across the plurality of timesteps. In some embodiments, inputs to an intervention recommendation reinforcement learning machine learning model comprise vectors describing candidate intervention routine reward measures and candidate intervention routine loss measures for particular candidate intervention routines. In some embodiments, outputs of an intervention recommendation reinforcement learning machine learning model comprise a vector describing an optimal intervention routine.

The term "candidate intervention routine" may refer to a data construct that describes a mapping of c event categories to d defined timesteps, where each defined timestep is assigned a unique m-sized subset of the c event categories, such that the assigned m-sized subsets of no two timesteps are identical. For example, given m=1, then each timestep (e.g., each month of the year) may be assigned one distinct event category (e.g., one distinct pharmacy, such as a distinct pharmacy that is audited during the particular timestep such as the particular month of the year). Accordingly, each candidate intervention routine is characterized by an ordered set $A=\{A_1, A_2, \ldots, A_d\}$, where each $A_j$ is a unique set of m event categories (e.g., pharmacies) assigned to a jth timestep of the d defined timesteps. For example, given m=1, the ordered set may describe that (in accordance with a candidate intervention routine) a pharmacy P3 should be audited at a first timestep, a pharmacy P5 should be audited at a second timestep, and so on. In some embodiments, because a candidate intervention routine defines a unique m-sized subset of the c event categories for each defined timestep of the d defined timesteps, the candidate intervention routine associates each jth timestep with m temporal event category scores for m category-timestep pairs, wherein each category-timestep pair of the m category-timestep pairs for a jth timestep is associated with one of the m event categories in the unique m-sized subset for the jth timestep and the jth timestep. For example, given m=1, the month of January that is associated with the pharmacy P3 may be associated with the temporal event category score for the month of January. Let us define the set of m temporal event category scores for the m event-timestep pairs each associated with one of the m event categories assigned to a jth timestep and the jth timestep to be the set $B_j = \{f_{1\_j}, \ldots, f_{m\_j}\}$, where each $f_{i\_j}$ is the temporal event category score for an event-timestep pair that is associated with: (i) the ith event category of the m event categories assigned to the jth timestep by the particular candidate intervention routine, and (ii) the jth timestep. Accordingly, via defining a set B for each defined timestep, the particular candidate intervention routine assigns the defined timestep to each temporal event category score that is associated with a first category-timestep pair that is associated with: (i) one of those event categories that are in the unique m-sized subset for the defined timestep and, and (ii) the defined timestep.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing health-related predictive data analysis. The architecture 100 includes a predictive data analysis system 101 configured to receive health-related predictive data analysis requests from external computing entities 102, process the predictive data analysis requests to generate predictions, provide the generated predictions to the external computing entities 102, and automatically perform prediction-based actions based at least in part on the predictions.

Examples of prediction-based actions include performing automated operations corresponding to optimal intervention operation sets, generating audiovisual notifications corresponding to optimal intervention operation sets, performing operational load balancing operations for intervention servers that are configured to perform operations corresponding to optimal intervention operation sets, and/or the like. In some embodiments, performing the prediction-based actions comprises generating user interface data for a prediction output user interface that is configured to describe intervention operations for a set of event categories across a set of defined timesteps.

In some embodiments, predictive data analysis system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more external computing entities 102, process the predictive data analysis requests to generate predictions corresponding to the predictive data analysis requests, provide the predictions to the external computing entities 102, and automatically perform prediction-based actions based at least in part on the generated predictions.

The storage subsystem 108 may be configured to store input data used by the predictive data analysis computing entity 106 to perform health-related predictive data analysis as well as model definition data used by the predictive data analysis computing entity 106 to perform various health-related predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with other various entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various positions or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

As described below, various embodiments of the present invention address technical challenges related to efficiently performing exploration-exploitation traversal of an input space by using operations having a linear computational complexity. As described below, in some embodiments, because a candidate intervention routine assigns a unique set of m event categories to each defined timestep, this ensures that different sets of event categories are selected for intervention during different timesteps (e.g., different sets of pharmacies are selected for audit during different months), which in turn ensures that a degree of exploration of the set of c event categories is enforced in determining optimal intervention routines, which helps enforce an exploration-exploitation traversal of the c event categories across the d defined timesteps. In this way, various embodiments of the present invention are able to enable a reinforcement machine learning model to perform exploration-exploitation traversal of an input space by using assignment/mapping operations having a linear computational complexity. In this way, various embodiments of the present invention improve the computational efficiency of performing reinforcement machine learning.

Various embodiments of the present invention describe techniques for generating an event scoring machine learning model and for using the event score sets generated by the event scoring machine learning model to generate an optimal intervention routine. However, a person of ordinary skill in the relevant technology will recognize that: (i) an optimal intervention routine can be generated in accordance with the techniques described herein by using event score sets generated by event scoring machine learning models having different architecture; (ii) the event score sets generated by event scoring machine learning models described herein can be used to perform actions/operations other than generating optimal intervention routines and/or other than generating optimal intervention routines in accordance with the techniques described herein; and (iii) each of optimal intervention routine operations described herein and the event scoring machine learning model generation operations described herein can be performed by a separate set of computing entities that may or may not be disjoint sets of computing entities.

Generating Event Scoring Machine Learning Models

FIG. 4 is a flowchart diagram of an example process 400 for generating an event scoring machine learning model. Via the various steps/operations of the process 400, the predictive data analysis computing entity 106 can train an event scoring machine learning model using a multi-category training measure associated with a plurality of intervention categories. Once trained, the event scoring machine learning model may be used to generate categorical event scores for particular input events with respect to the plurality of intervention categories.

The process 400 begins at step/operation 401 when the predictive data analysis computing entity 106 identifies a set of training events. Each training event may be associated with one or more training event features, a defined timestep of a plurality of defined timesteps (e.g., a defined month of 12 defined months), and a plurality of intervention labels for the plurality of intervention categories. An example of a training event is a data object that describes: one or more recorded features of a processed pharmacy claim as well as a set of intervention labels each describing whether the processed pharmacy claim has been subject to an audit having a corresponding audit type and, if so, the outcome of the noted audit. Examples of recorded features of a processed pharmacy claim include an approved due amount of the processed pharmacy claim, an age of a member associated with the processed pharmacy claim, a drug group of a drug/medication associated with the processed pharmacy claim, a number of supplied days of the processed pharmacy claim, a gender of the member associated with the processed pharmacy claim. Examples of intervention labels associated with a processed pharmacy claim include: an intervention label describing whether the processed pharmacy claim has been subject to a desktop audit, and, if so, the outcome of the desktop audit; an intervention label describing whether the processed pharmacy claim has been subject to an onsite audit, and, if so, the outcome of the onsite audit; and an intervention label describing whether the processed pharmacy claim has been subject to a Fraud, Waste, and Abuse (FWA) audit, and, if so, the outcome of the FWA audit, and/or the like.

In some embodiments, a defined timestep describes a categorization of a period of time, such as a categorization of a recurring period of time. An example of a defined timestep is a defined timestep corresponding to a month of a year (e.g., to January). In some embodiments, given a set of i intervention categories, the event scoring machine learning model is configured to generate a set of i event scores for each recorded event (e.g., each input event, each training event, and/or the like). In some embodiments, given a set of i intervention categories, the predictive data analysis computing entity 106 is configured to generate a set of i per-intervention temporal event category scores for each category-timestep pair that is associated with a particular event category and a particular defined timestep. For example, in some embodiments, when the set of event categories correspond to a set of pharmacies, and the set of defined timesteps correspond to a set of months, then the predictive data analysis computing entity 106 may be configured to generate i per-intervention temporal event category scores for each pharmacy during each month. For example, for a pharmacy P1, the predictive data analysis computing entity 106 may generate i per-intervention temporal event category scores for the pharmacy P1 with respect to the month of January, i per-intervention temporal event category scores for the pharmacy P1 with respect to the month of February, i per-intervention temporal event category scores for the pharmacy P1 with respect to the month of March, and so on.

In some embodiments, an event category describes a defined subset of a set of events (e.g., a set of training events, a set of input events, and/or the like). For example, when a set of events describe a set of processed pharmacy claims that are associated with a set of pharmacies, then an event category may describe a subset of the set of processed pharmacy claims that are associated with a particular pharmacy in the set of pharmacies. As described above, the predictive data analysis computing entity 106 may be configured to generate a set of per-intervention temporal event category scores for each category-timestep pair that describes a combination of a particular event category and a particular defined timestep. For example, for a pharmacy P1, the predictive data analysis computing entity 106 may generate i per-intervention temporal event category scores for the pharmacy P1 with respect to the month of January, i per-intervention temporal event category scores for the pharmacy P1 with respect to the month of February, i per-intervention temporal event category scores for the pharmacy P1 with respect to the month of March, and so on.

In some embodiments, an intervention category describes a set of automated operations and/or a set of manual operations that may be performed with respect to the recorded events of an event category. Examples of intervention categories describe various types of audits (e.g., onsite audits, desktop audits, FWA audits, and/or the like) that may be performed on processed pharmacy claims associated with a set of pharmacies. As described above, for each category-timestep pair that is associated with a particular event category (e.g., a particular pharmacy) and a particular defined timestep (e.g., a particular month of the year), the predictive data analysis computing entity 106 may be configured to generate a set of per-intervention temporal event category scores each associated with an intervention category of a set of intervention categories. For example, given a set of intervention categories that comprise an onsite audit intervention category and a desktop audit intervention category, the predictive data analysis computing entity 106 may generate, for each category-timestep pair that is associated with a particular pharmacy and a particular month of the year, two per-intervention temporal event category scores: a first per-intervention temporal event category score that describes a predicted recommendation score for performing operations corresponding to the onsite audit intervention category with respect to the recorded events of the particular pharmacy during the particular month, and a second per-intervention temporal event category score that describes a predicted recommendation score for performing operations corresponding to the desktop audit intervention category with respect to the recorded events of the particular pharmacy during the particular month.

In some embodiments, given i intervention categories, each training event is associated with i intervention labels, where each intervention label describes whether a corresponding intervention category has been performed with respect to a corresponding training event and, if the corresponding intervention has been performed, the results of the corresponding training event. For example, given a set of intervention categories that comprise an onsite audit intervention category and a desktop audit intervention category, a particular training event associated with a particular pharmacy claim may be associated with two intervention labels: a first intervention label describing whether operations corresponding to an onsite audit intervention category have been performed with respect to the particular pharmacy claim, and, if so, the results of the noted operations, and a second intervention label describing whether operations corresponding to a desktop audit intervention category have been performed with respect to the particular pharmacy claim, and, if so, the results of the noted operations. Accordingly, each intervention label for a particular training event may be associated with a corresponding intervention category and may have one of three values: a first value describing a negative occurrence of the corresponding intervention category with respect to the particular training event (e.g., describing that the operations of the corresponding intervention category have been performed with respect to the particular training event and no discrepancy/error of the particular training event has been detected after performing the noted operations), a second value describing an affirmative occurrence of the corresponding intervention category with respect to the particular training event (e.g., describing that the operations of the corresponding intervention category have been performed with respect to the particular training event and at least one discrepancy/error of the particular training event has been detected after performing the noted operations), and a third value describing non-occurrence of the corresponding intervention category with respect to the particular training event (e.g., describing that the operations of the corresponding intervention category have not been performed at all with respect to the particular training event).

An operational example of a set of training events 501 is depicted in FIG. 5. As depicted in FIG. 5, each training event is associated with a non-header row of the depicted table and is characterized by a set of training event features defined by columns 502 of the depicted table as well as by two intervention labels defined by columns 503-504 of the depicted table.

For example, as depicted in FIG. 5, the first training event associated with the first non-header row of the depicted table is characterized by: (i) a set of training event features including the approved due amount feature of 165.8, the corresponding member age feature of 82, the number of supplied days feature of 28, the corresponding drug group of 550060, and the member gender feature of male, (ii) an intervention label of 1 with respect to a desktop audit intervention category that describes affirmative occurrence of the desktop audit intervention category with respect to the processed pharmacy claim of the first training event (e.g., describes that operations of the desktop audit intervention category have been performed with respect to the processed pharmacy claim of the first training event and the noted operations detected at least one discrepancy/error with respect to the processed pharmacy claim of the first training event), and (iii) an intervention label of 2 with respect to an onsite audit intervention category that describes non-occurrence of the onsite audit intervention category with respect to the processed pharmacy claim of the first training event (e.g., describes that operations of the onsite audit intervention category have not been performed at all with respect to the processed pharmacy claim of the first training event).

As another example, as depicted in FIG. 5, the second training event associated with the second non-header row of the depicted table is characterized by: (i) a set of training event features including the approved due amount feature of 6789.2, the corresponding member age feature of 63, the number of supplied days feature of 56, the corresponding drug group of 456089, and the member gender feature of male, (ii) an intervention label of 0 with respect to a desktop audit intervention category that describes the negative occurrence of the desktop audit intervention category with respect to the processed pharmacy claim of the second training event (e.g., describes that operations of the desktop audit intervention category have been performed with respect to the processed pharmacy claim of the second training event and the noted operations detected no discrepancy/error with respect to the processed pharmacy claim of the second training event), and (iii) an intervention label of two with respect to an onsite audit intervention category that describes non-occurrence of the onsite audit intervention category with respect to the processed pharmacy claim of the second training event (e.g., describes that operations of the onsite audit intervention category have not been performed at all with respect to the processed pharmacy claim of the second training event).

Returning to FIG. 4, at step/operation 402, the predictive data analysis computing entity 106 determines a sub-model training subset of the group of training events for each categorical event scoring sub-model of the event scoring machine learning model. In some embodiments, for each categorical event scoring sub-model of the event scoring machine learning model, the predictive data analysis computing entity 106 generates a sub-model training subset of the group of training events by excluding training events that are associated with intervention labels describing non-occurrence of the intervention category associated with the categorical event scoring sub-model from the group of training events.

In some embodiments, given a set of i intervention categories, the event scoring machine learning model comprises i categorical event scoring sub-models, where each categorical event scoring sub-model is configured to generate, for an input/training event, a categorical event score with respect to the intervention category that is associated with the categorical event scoring sub-model. For example, given a set of intervention categories that comprise a desktop audit intervention category and an online audit intervention category, the event scoring machine learning model may comprise two categorical event scoring sub-models: a first categorical event scoring sub-model that is configured to generate a categorical event score for an input/training event that describes a predicted/inferred likelihood that performing operations of the desktop audit intervention category with respect to the input/training event will generate an affirmative (e.g., a successful discrepancy/error detection) outcome, and a second categorical event scoring sub-model that is configured to generate a categorical event score for an input/training event that describes a predicted/inferred likelihood that performing operations of the online audit intervention category with respect to the input/training event will generate an affirmative (e.g., a successful discrepancy/error detection) outcome.

In some embodiments, at step/operation 402, the predictive data analysis computing entity 106 first generates a separate training set for each categorical event scoring sub-model of the i categorical event scoring sub-models of the event scoring machine learning model by excluding, from the entire training set identified in step/operation 401, each training event that is associated with an intervention label with respect to the intervention category of the categorical event scoring sub-model that describes non-occurrence of the intervention category with respect to the training event. For example, assume that the entire training set includes three training events, with the first training event having an intervention label with respect to the desktop audit intervention category that describes affirmative occurrence of the desktop audit intervention category with respect to the first training event, the second training event having an intervention label with respect to the desktop audit intervention category that describes negative occurrence of the desktop audit intervention category with respect to the second training event, and the third training event having an intervention label with respect to the desktop audit intervention category that describes non-occurrence of the desktop audit intervention category with respect to the third training event. In this example, the training set for a categorical event scoring sub-model that is associated with the desktop audit intervention category may simply comprise the first training event and the second training event, but not the third training event, as the third training event is associated with an intervention label that describes non-occurrence of the desktop audit intervention category, and thus has no ground-truth outcome data that is relevant to the predictive task of the categorical event scoring sub-model that is associated with generating categorical event scores for the desktop audit intervention category in particular. In this example, the set comprising the first training event and the second training event, which is generated by excluding the third training event from the entire training set, is referred to as the sub-model training subset for the categorical event scoring sub-model that is associated with generating categorical event scores for the desktop audit intervention category.

An operational example of generating two sub-model training subsets 611-612 for two categorical event scoring sub-models of an event scoring machine learning model is depicted in FIG. 6. As depicted in FIG. 6, the entire training set 601 is used to generate, for a first categorical event scoring sub-model that is configured to generate categorical event scores pertaining to a desktop audit intervention category, a sub-model training subset 611 that only comprises those training events from the entire training set 601 that are associated with either an intervention label of 0 with respect to the desktop audit intervention category (i.e., describing negative occurrence of the desktop audit intervention category) or an intervention label of 1 with respect to the desktop audit intervention category (i.e., describing affirmative occurrence of the desktop audit intervention category). This means that those training events that are associated with intervention labels of 2 with respect to the desktop audit intervention category (i.e., describing non-occurrence of the desktop audit intervention category) are excluded from the sub-model training subset 611 for the first categorical event scoring sub-model.

As further depicted in FIG. 6, the entire training set 601 is used to generate, for a second categorical event scoring sub-model that is configured to generate categorical event scores pertaining to an online audit intervention category, a sub-model training subset 612 that only comprises those training events from the entire training set 601 that are associated with either an intervention label of 0 with respect to the online audit intervention category (i.e., describing negative occurrence of the online audit intervention category) or an intervention label of 1 with respect to the online audit intervention category (i.e., describing affirmative occurrence of the online audit intervention category). This means that those training events that are associated with intervention labels of 2 with respect to the online audit intervention category (i.e., describing non-occurrence of the online audit intervention category) are excluded from the sub-model training subset 612 for the second categorical event scoring sub-model.

Returning to FIG. 4, at step/operation 403, the predictive data analysis computing entity 106 generates a sub-model training measure for each categorical event scoring sub-model based at least in part on the sub-model training subset for the categorical event scoring sub-model. In some embodiments, given a categorical event scoring sub-model that is associated with a sub-model training subset and a corresponding intervention category, the sub-model training measure is determined as a loss measure (e.g., a cross-entropy loss measure, a mean squared error loss measure, and/or the like) that describes, for each training event in the sub-model training subset for the categorical event scoring sub-model, a measure of deviation between an inferred categorical event score for the training event as determined via processing the training event features for the training event using the categorical event scoring sub-model and an intervention label for the training event with respect to the corresponding intervention category of the categorical event scoring sub-model.

For example, consider a categorical event scoring sub-model that is configured to generate categorical event scores with respect to a desktop audit intervention category and is associated with two training events, where a first training event describes negative occurrence of the desktop audit intervention category with respect to a corresponding processed pharmacy claim and a second training event describes negative occurrence of the desktop audit intervention category with respect to the corresponding processed pharmacy claim. In this example, if the categorical event scoring sub-model generates, during training, a categorical event score of $s_1$ for the first training event and via processing the training event features of the first training event, and further generates a categorical event score of $s_2$ for the second training event and via processing the training event features of the second training event, then the sub-model training measure for the exemplary categorical event scoring sub-model may be determined based at least in part on: (i) a deviation measure of $s_1$ and a value describing a negative occurrence intervention label (e.g., a value of zero), and (ii) a deviation measure of $s_2$ and a value describing an affirmative occurrence intervention label (e.g., a value of one). For example, in some embodiments, the sub-model training measure for the categorical event scoring sub-model may be generated based at least in part on the output of $(|0-s_1|^2 + |1-s_2|^2)$.

For example, as depicted in FIG. 6, given the sub-model training subset 611 for the first categorical event scoring sub-model that is associated with the desktop onsite intervention category, the sub-model training measure 621 (i.e., the Loss1 measure) for the first categorical event scoring sub-model may be determined based at least in part on: (i) a measure of deviation of the intervention label of 0 for the desktop onsite intervention category and the inferred categorical event score of 0.65432 for the first training event in the sub-model training subset 611, (ii) a measure of deviation of the intervention label of 1 for the desktop onsite intervention category and the inferred categorical event score of 0.25678 for the second training event in the sub-model training subset 611, (iii) a measure of deviation of the intervention label of 1 for the desktop onsite intervention category and the inferred categorical event score of 0.38729 for the third training event in the sub-model training subset 611, and (iv) a measure of deviation of the intervention label of 0 for the desktop onsite intervention category and the inferred categorical event score of 0.78023 for the fourth training event in the sub-model training subset 611.

As another example, as further depicted in FIG. 6, given the sub-model training subset 612 for the second categorical event scoring sub-model that is associated with the online onsite intervention category, the sub-model training measure 622 (i.e., the Loss2 measure) for the second categorical event scoring sub-model may be determined based at least in part on: (i) a measure of deviation of the intervention label of 1 for the desktop onsite intervention category and the inferred categorical event score of 0.74396 for the first training event in the sub-model training subset 612, (ii) a measure of deviation of the intervention label of 1 for the desktop onsite intervention category and the inferred categorical event score of 0.07834 for the second training event in the sub-model training subset 612, (iii) a measure of deviation of the intervention label of 0 for the desktop onsite intervention category and the inferred categorical event score of 0.15672 for the third training event in the sub-model training subset 612, (iv) a measure of deviation of the intervention label of 1 for the desktop onsite intervention category and the inferred categorical event score of 0.61982 for the fourth training event in the sub-model training subset 612, and (v) a measure of deviation of the intervention label of 1 for the desktop onsite intervention category and the inferred categorical event score of 0.77213 for the fifth training event in the sub-model training subset 612.

Returning to FIG. 4, at step/operation 404, the predictive data analysis computing entity 106 generates a model training measure for the event scoring machine learning model based at least in part on each sub-model training measure that is determined at step/operation 403. In particular, given i categorical event scoring sub-models that are associated with i sub-model training measures, the i sub-model training measures may be combined to generate the model training measure. For example, combining the i sub-model training measures for i categorical event scoring sub-models of an event scoring machine learning model may be performed based at least in part on a tunable intervention significance parameter for each of the plurality of intervention categories. For example, in some embodiments, given i sub-model training measures for i categorical event scoring sub-models of an event scoring machine learning model, each sub-model training measure is adjusted based at least in part on a tunable (e.g., trained) intervention significance parameter of the intervention category that is associated with the corresponding categorical event scoring sub-model for the sub-model training measure to generate an adjusted sub-model training measure for the categorical event scoring sub-model, and then the i adjusted sub-model training measures for i the categorical event scoring sub-models of the event scoring machine learning model are combined/aggregated to generate the model training measure for the event scoring machine learning model.

In some embodiments, given i categorical event scoring sub-models of an event scoring machine learning model, the model training measure for the event scoring machine learning model is determined based at least in part on the output of the equation $$\frac{w_1 \text{ loss}_1 + \ldots + w_i \text{ loss}_i}{w_1 + \ldots + w_i},$$

where each $w_j$ is the tunable intervention significance parameter for a jth intervention category that is associated with a jth categorical event scoring sub-model, each $\text{loss}_j$ is the sub-model training measure for the jth categorical event scoring sub-model, and each $w_j \text{loss}_j$ is the adjusted sub-model training measure for the jth categorical event scoring sub-model. For example, as depicted in FIG. 6, the model training measure 631 is determined using the noted equation and based at least in part on the sub-model training measure 621 (i.e., the Loss1 measure) for the first categorical event scoring sub-model, the exemplary tunable intervention significance parameter of 4 for the first categorical event scoring sub-model, the sub-model training measure 622 (i.e., the Loss2 measure) for the second categorical event scoring sub-model, and the exemplary tunable intervention significance parameter of 5 for the second categorical event scoring sub-model.

Returning to FIG. 4, at step/operation 405, the predictive data analysis computing entity 106 generates the event scoring machine learning model by optimizing (e.g., minimizing) the model training measure for the event scoring machine learning model. In some embodiments, the predictive data analysis computing entity 106 updates the values of the trainable parameters of the event scoring machine learning model (e.g., including the values of the trainable parameters of at least one of the categorical event scoring sub-models of the event scoring machine learning model) to optimize the model training measure. Optimizing the model training measure may include performing one or more global optimization measures and/or local optimization measures (e.g., via performing one or more gradient descent optimization operations, such as performing one or more gradient descent with backpropagation operations) on the model training measure to find a desired optimum point/region of the model training measure, and then updating the trainable parameters of the event scoring machine learning model in accordance with the values associated with input dimensions of the desired optimum point/region of the model training measure.

Generating Optimal Intervention Routines

FIG. 7 is a flowchart diagram of an example process 700 for determining an optimal intervention routine for a plurality of defined timesteps across a plurality of event categories. Via the various steps/operations of the process 700, the predictive data analysis computing entity 106 may use event score sets generated for input events (e.g., event score sets generated using an event scoring machine learning model, such as an event scoring machine learning model that is trained in accordance with the process 400 of FIG. 4) to generate an optimal assignment of intervention categories to event categories across timesteps.

The process 700 begins at step/operation 701 when the predictive data analysis computing entity 106 identifies a group of input events, where each input event is associated with an event category (e.g., an associated pharmacy profile), a defined timestep (e.g., a particular month of the year), one or more input event features, and an event score set (e.g., an event score set comprising i categorical event scores for the input event with respect to i intervention categories, for example as generated by processing the input event features of the noted input event using i categorical event scoring sub-models of an event scoring machine learning model, such as an event scoring machine learning model trained in accordance with the process 400 of FIG. 4).

An example of an input event is a data object that describes: one or more recorded features of a processed pharmacy claim as well as a set of intervention labels each describing whether the processed pharmacy claim has been subject to an audit having a corresponding audit type and, if so, the outcome of the noted audit. Examples of recorded features of a processed pharmacy claim include an approved due amount of the processed pharmacy claim, an age of a member associated with the processed pharmacy claim, a drug group of a drug/medication associated with the processed pharmacy claim, a number of supplied days of the processed pharmacy claim, a gender of the member associated with the processed pharmacy claim. Examples of categorical event scores associated with a processed pharmacy claim include a categorical event score describing whether a desktop audit is likely to lead to a target outcome with respect to the processed pharmacy claim, a categorical event score describing whether an online audit is likely to lead to a target outcome with respect to the processed pharmacy claim, a categorical event score describing whether an FWA audit is likely to lead to a target outcome with respect to the processed pharmacy claim, and/or the like.

In some embodiments, the event scoring machine learning model is configured to, for each input event: (i) identify input event features associated with the input event, and (ii) process the input event features associated with the input event using i categorical event scoring sub-models of the event scoring machine learning model to generate i categorical event scores for the input event with respect to i intervention categories that are associated with the i categorical event scoring sub-models. For example, if the set of intervention categories comprise a desktop audit intervention category and an online audit intervention category, then the event scoring machine learning model may comprise: (i) a categorical event scoring sub-model associated with the desktop audit intervention category that is configured to process the input event features associated with a particular input event to determine a categorical input event score that describes a predicted recommendation score for performing operations of the desktop audit intervention category with respect to the processed pharmacy claim that is associated with the particular input event, and (ii) a categorical event scoring sub-model associated with the online audit intervention category that is configured to process the input event features associated with a particular input event to determine a categorical input event score that describes a predicted recommendation score for performing operations of the online audit intervention category with respect to the processed pharmacy claim that is associated with the particular input event.

At step/operation 702, the predictive data analysis computing entity 106 generates a temporal event category score for each category-timestep pair that is associated with a particular event category and a particular defined timestep. For example, the predictive data analysis computing entity 106 may describe a temporal event category score for a category-timestep pair that is associated with a particular pharmacy and a particular month of the year that describes an expected measure of cost saving for performing an audit/intervention of the particular pharmacy during the particular month.

As described above, a defined timestep may describe a categorization of a period of time, such as a categorization of a recurring period of time. An example of a defined timestep is a defined timestep corresponding to a month of a year (e.g., to January). In some embodiments, given a set of i intervention categories, the event scoring machine learning model is configured to generate a set of i event scores for each recorded event (e.g., each input event, each training event, and/or the like). In some embodiments, given a set of i intervention categories, the predictive data analysis computing entity 106 is configured to generate a set of i per-intervention temporal event category scores for each category-timestep pair that is associated with a particular event category and a particular defined timestep. For example, in some embodiments, when the set of event categories correspond to a set of pharmacies, and the set of defined timesteps correspond to a set of months, then the predictive data analysis computing entity 106 may be configured to generate i per-intervention temporal event category scores for each pharmacy during each month. For example, for a pharmacy P1, the predictive data analysis computing entity 106 may generate i per-intervention temporal event category scores for the pharmacy P1 with respect to the month of January, i per-intervention temporal event category scores for the pharmacy P1 with respect to the month of February, i per-intervention temporal event category scores for the pharmacy P1 with respect to the month of March, and so on.

As further described above, an event category may describe a defined subset of a set of events (e.g., a set of training events, a set of input events, and/or the like). For example, when a set of events describe a set of processed pharmacy claims that are associated with a set of pharmacies, then an event category may describe a subset of the set of processed pharmacy claims that are associated with a particular pharmacy in the set of pharmacies. As described above, the predictive data analysis computing entity 106 may be configured to generate a set of per-intervention temporal event category scores for each category-timestep pair that describes a combination of a particular event category and a particular defined timestep. For example, for a pharmacy P1, the predictive data analysis computing entity 106 may generate i per-intervention temporal event category scores for the pharmacy P1 with respect to the month of January, i per-intervention temporal event category scores for the pharmacy P1 with respect to the month of February, i per-intervention temporal event category scores for the pharmacy P1 with respect to the month of March, and so on.

As further described above, an intervention category may describe a set of automated operations and/or a set of manual operations that may be performed with respect to the recorded events of an event category. Examples of intervention categories describe various types of audits (e.g., onsite audits, desktop audits, FWA audits, and/or the like) that may be performed on processed pharmacy claims associated with a set of pharmacies. As described above, for each category-timestep pair that is associated with a particular event category (e.g., a particular pharmacy) and a particular defined timestep (e.g., a particular month of the year), the predictive data analysis computing entity 106 may be configured to generate a set of per-intervention temporal event category scores each associated with an intervention category of a set of intervention categories. For example, given a set of intervention categories that comprise an onsite audit intervention category and a desktop audit intervention category, the predictive data analysis computing entity 106 may generate, for each category-timestep pair that is associated with a particular pharmacy and a particular month of the year, two per-intervention temporal event category scores: a first per-intervention temporal event category score that describes a predicted recommendation score for performing operations corresponding to the onsite audit intervention category with respect to the recorded events of the particular pharmacy during the particular month, and a second per-intervention temporal event category score that describes a predicted recommendation score for performing operations corresponding to the desktop audit intervention category with respect to the recorded events of the particular pharmacy during the particular month.

In some embodiments, step/operation 702 may be performed in accordance with the process that is depicted in FIG. 8, which is an example process for determining a temporal event category score for a particular category-timestep pair that is associated with a particular event category (e.g., a particular pharmacy) and a particular defined timestep (e.g., a particular month of the year). The process that is depicted in FIG. 8 begins at step/operation 801 when the predictive data analysis computing entity 106 identifies a related subset of the group of input events that are associated with the particular event category and the particular defined timestep. For example, the predictive data analysis computing entity 106 may identify all of the processed pharmacy claims that are associated with a particular pharmacy and a particular month of the year (e.g., the month of January).

At step/operation 802, the predictive data analysis computing entity 106 identifies, for each related input event that is in the related subset that was identified in step/operation 801, an event score set that comprises i categorical event scores for the related input event with respect to i intervention categories. For example, given a set of intervention categories that comprise a desktop audit intervention category and an online audit intervention category, with respect to a particular processed pharmacy claim associated with a particular pharmacy and a particular month of the year (e.g., the month of January), for each related input event that is associated with the particular pharmacy and the particular month of the year, an event score set comprising two categorical event scores may be identified: a first categorical event score that describes the categorical event score for the related input event with respect to the desktop audit intervention category, and a second categorical event score that describes the categorical event score for the related input event with respect to the online audit intervention category. As described above, each event score set may be generated by processing the input event features of a corresponding related input event using the categorical event scoring sub-models of an event scoring machine learning model, such as an event scoring machine learning model trained in accordance with the process 400 of FIG. 4.

For example, consider a pharmacy-month pair that is associated with three processed pharmacy claims for the particular pharmacy and the particular month. In this scenario, given a set of intervention categories that comprise a desktop audit intervention category and an online audit intervention category (and thus given i=2), three event score sets may be identified/generated: a first event score set that describes a categorical event score for the first processed pharmacy claim with respect to the desktop audit intervention category and a categorical event score for the first processed pharmacy claim with respect to the online audit intervention category, a second event score set that describes a categorical event score for the second processed pharmacy claim with respect to the desktop audit intervention category and a categorical event score for the second processed pharmacy claim with respect to the online audit intervention category, and a third event score set that describes a categorical event score for the third processed pharmacy claim with respect to the desktop audit intervention category and a categorical event score for the third processed pharmacy claim with respect to the online audit intervention category.

At step/operation 803, the predictive data analysis computing entity 106 generates i per-intervention temporal event category scores for the particular category-timestep pair, where each per-intervention temporal event category score is associated with a particular intervention category of the i intervention categories and is determined by combining (e.g., averaging) the categorical event scores for the particular intervention category across all of the input events in the related subset for the particular category-timestep pair.

In some embodiments, combining the categorical event scores for the particular intervention category across all of the input events in the related subset for the particular category-timestep pair comprises generating a statistical distribution measure (e.g., a mean, a median, a mode, and/or the like) of the particular intervention category across all of the input events in the related subset for the particular category-timestep pair and generating the per-intervention temporal event category score for the particular category-timestep pair and the particular intervention category based at least in part on the statistical distribution. In some embodiments, combining the categorical event scores for the particular intervention category across all of the input events in the related subset for the particular category-timestep pair comprises processing the categorical event scores for the particular intervention category across all of the input events in the related subset for the particular category-timestep pair using an event score aggregation machine learning model for the particular intervention category and generating the per-intervention temporal event category score for the particular category-timestep pair and the particular intervention category based at least in part on the model output of the noted processing.

For example, consider a pharmacy-month pair that is associated with three processed pharmacy claims for the particular pharmacy and the particular month. In this scenario, given a set of intervention categories that comprise a desktop audit intervention category and an online audit intervention category (and thus given i=2), two per-intervention temporal event category scores may be determined for the pharmacy-month pair. In this example, the first per-intervention temporal event category score may be associated with the desktop audit category score and may be determined by combining (e.g., averaging) a categorical event score for the first processed pharmacy claim with respect to the desktop audit intervention category, a categorical event score for the second processed pharmacy claim with respect to the desktop audit intervention category, and a categorical event score for the first third pharmacy claim with respect to the desktop audit intervention category. Moreover, the second per-intervention temporal event category score may be associated with the online audit category score and may be determined by combining (e.g., averaging) a categorical event score for the first processed pharmacy claim with respect to the online audit intervention category, a categorical event score for the second processed pharmacy claim with respect to the online audit intervention category, and a categorical event score for the first third pharmacy claim with respect to the online audit intervention category.

An operational example of a set of per-intervention temporal event category scores is depicted in FIG. 9. For example, as depicted in FIG. 9, the category-timestep pair that is associated with an event category corresponding to the pharmacy P1 and the defined timestep corresponding to the month of January is associated with two per-intervention temporal event category scores for the two intervention categories comprising a desktop audit intervention category and an online audit intervention category: the per-intervention temporal event category score of 0.45 for the desktop audit intervention category and the per-intervention temporal event category score of 0.5 for the online audit intervention category. As another example, as depicted in FIG. 9, the category-timestep pair that is associated with an event category corresponding to the pharmacy P3 and the defined timestep corresponding to the month of August is associated with two per-intervention temporal event category scores for the two intervention categories comprising a desktop audit intervention category and an online audit intervention category: the per-intervention temporal event category score of 0.2 for the desktop audit intervention category and the per-intervention temporal event category score of 0.4 for the online audit intervention category. As yet another example, as depicted in FIG. 9, the category-timestep pair that is associated with an event category corresponding to the pharmacy P5 and the defined timestep corresponding to the month of December is associated with two per-intervention temporal event category scores for the two intervention categories comprising a desktop audit intervention category and an online audit intervention category: the per-intervention temporal event category score of 0.2 for the desktop audit intervention category and the per-intervention temporal event category score of 0.4 for the online audit intervention category.

Returning to FIG. 8, at step/operation 804, the predictive data analysis computing entity 106 determines the temporal event category score for the particular category-timestep pair (e.g., the particular pharmacy-month pair) based at least in part on the i per-intervention temporal event category scores for the particular category-timestep pair, and a total utility value (e.g., a total paid amount measure, as depicted in the Paid Amt columns of the table depicted in FIG. 9) for the particular category-timestep pair. In some embodiments, the temporal event category score describes a total expected reward (e.g., the total expected recoupment measure of the total paid amount) for a particular category-timestep, such as the total expected recoupment measure of the total paid amount for performing an audit/intervention with respect to a particular pharmacy during a particular month of the year.

In some embodiments, the temporal event category score for a particular category-timestep pair is determined by: (i) combining (e.g., averaging, computing a weighted average, and/or the like) the i per-intervention temporal event category scores for the particular category-timestep pair with respect to the i intervention categories to generate an aggregate reward probability for the particular category-timestep, and (ii) combining (e.g., multiplying) the aggregate reward measure for the particular category-timestep and the total utility value for the particular category-timestep. For example, the temporal event category score for a particular pharmacy-month pair across two intervention categories may be determined by: (i) combining the two intervention temporal event category scores for the particular pharmacy-month pair to generate an aggregate reward probability for the pharmacy-month pair that describes an inferred/predicted likelihood that auditing the pharmacy during the particular month detects a discrepancy, and (ii) combining the aggregate reward probability for the pharmacy-month pair with a total paid amount for the pharmacy-month pair that describes a total amount paid to the pharmacy for processed pharmacy claims associated with the month to generate the temporal event category score for the pharmacy-month pair.

In some embodiments, given i intervention categories, the aggregate reward probability for a category-timestep pair is determined based at least in part on the output of the equation $$\frac{w_1 s_1 + \ldots + w_i s_i}{w_1 + \ldots + w_i},$$

where each $w_j$ is the tunable intervention significance parameter for a jth intervention category that is associated with a jth per-intervention temporal event category score (as described above), and each $s_j$ is the per-intervention temporal event category score for the category-timestep pair with respect to the jth intervention category. In some embodiments, given i intervention categories, the aggregate reward probability for a category-timestep pair is determined based at least in part on processing the i per-intervention temporal event category scores for the category-timestep pair using a per-intervention temporal event category score aggregation machine learning model and generating the aggregate reward probability based at least in part on the output of the noted processing. In some embodiments, generating the temporal event category score for a particular category-timestep pair comprises processing the aggregate reward probability for the particular category-timestep pair and the total utility measure for the particular category-timestep pair using a temporal event category score generation machine learning model and generating the temporal event category score based at least in part on the output of the noted processing.

Returning to FIG. 7, at step/operation 703, the predictive data analysis computing entity 106 generates the optimal intervention routine using an intervention recommendation reinforcement learning machine learning model and based at least in part on the temporal event category score for the category-timestep pairs. In some embodiments, the optimal intervention routine is selected from a plurality of candidate intervention routines by the intervention recommendation reinforcement learning machine learning model via maximizing a candidate intervention routine reward measure and minimizing a candidate intervention routine loss measure. In some embodiments, each candidate intervention routine assigns a unique m-sized subset of the plurality of event categories to each defined timestep, each candidate intervention routine is associated with a per-timestep reward measure for each defined timestep that is generated based at least in part on each temporal event category score that is associated with a first category-timestep pair that is associated with: (i) one of those event categories that are in the unique m-sized subset for the defined timestep and, and (ii) the defined timestep, each candidate intervention routine is associated with a per-timestep loss measure for each defined timestep that is generated based at least in part on each temporal event category score that is associated with a second category-timestep pair that is associated with: (i) one of those event categories that are not in the unique m-sized subset for the defined timestep and, and (ii) the defined timestep, the candidate intervention routine reward measure for a particular candidate intervention routine is generated based at least in part on each per-timestep reward measure for the particular candidate intervention routine, and the candidate intervention routine loss measure for a particular candidate intervention routine is generated based at least in part on each per-timestep loss measure for the particular candidate intervention routine. In some embodiments, maximizing the candidate intervention routine reward measure and minimizing the candidate intervention routine loss measure is performed using a dual optimization routine that enforces an exploration-exploitation traversal of the plurality of event categories across the plurality of timesteps.

In some embodiments, a candidate intervention routine describes a mapping of c event categories to d defined timesteps, where each defined timestep is assigned a unique m-sized subset of the c event categories, such that the assigned m-sized subsets of no two timesteps are identical. For example, given m=1, then each timestep (e.g., each month of the year) may be assigned one distinct event category (e.g., one distinct pharmacy, such as a distinct pharmacy that is audited during the particular timestep such as the particular month of the year). Accordingly, each candidate intervention routine is characterized by an ordered set $A=\{A_1, A_2, \ldots, A_d\}$, where each $A_j$ is a unique set of m event categories (e.g., pharmacies) assigned to a jth timestep of the d defined timesteps. For example, given m=1, the ordered set may describe that (in accordance with a candidate intervention routine) a pharmacy P3 should be audited at a first timestep, a pharmacy P5 should be audited at a second timestep, and so on.

In some embodiments, because a candidate intervention routine defines a unique m-sized subset of the c event categories for each defined timestep of the d defined timesteps, the candidate intervention routine associates each jth timestep with m temporal event category scores for m category-timestep pairs, wherein each category-timestep pair of the m category-timestep pairs for a jth timestep is associated with one of the m event categories in the unique m-sized subset for the jth timestep and the jth timestep. For example, given m=1, the month of January that is associated with the pharmacy P3 may be associated with the temporal event category score for the month of January. Let us define the set of m temporal event category scores for the m event-timestep pairs each associated with one of the m event categories assigned to a jth timestep and the jth timestep to be the set $B_j=\{f_{1\_j}, \ldots, f_{m\_j}\}$, where each $f_{i\_j}$ is the temporal event category score for an event-timestep pair that is associated with: (i) the ith event category of the m event categories assigned to the jth timestep by the particular candidate intervention routine, and (ii) the jth timestep. Accordingly, via defining a set B for each defined timestep, the particular candidate intervention routine assigns the defined timestep to each temporal event category score that is associated with a first category-timestep pair that is associated with: (i) one of those event categories that are in the unique m-sized subset for the defined timestep, and (ii) the defined timestep.

In some embodiments, because a candidate intervention routine defines a unique m-sized subset of the c event categories for each defined timestep of the d defined timesteps, the candidate intervention routine in turn defines a unique (c-m)-sized subset of the c event categories for each defined timestep of the d defined timesteps that includes the event categories that are not assigned to the defined timestep under the candidate intervention routine (e.g., that the candidate intervention routine recommends should not be audited during the particular defined timestep). In some embodiments, the candidate intervention routine thus associates each jth timestep of the d defined timesteps with a set $C_j=\{f_{1\_j}, \ldots, f_{c-m\_j}\}$, where each $f_{i\_j}$ is the temporal event category score for an event-timestep pair that is associated with: (i) the ith event category of the c-m event categories that are not assigned to the jth timestep by the particular candidate intervention routine, and (ii) the jth timestep. Accordingly, via defining a set C for each defined timestep, the particular candidate intervention routine assigns the defined timestep to each temporal event category score that is associated with a first category-timestep pair that is associated with: (i) one of those event categories that are not in the unique m-sized subset for the defined timestep and, and (ii) the defined timestep.

In some embodiments, because a candidate intervention routine defines a set $B_j$ and a set $C_j$ for each jth timestep of the d defined timesteps, then the candidate intervention routine assigns each jth timestep to a per-timestep reward measure that is determined based at least in part on (e.g., by combining, such as averaging) all temporal event category scores in the $B_j$ for the jth timestep, and further each jth timestep to a per-timestep loss measure that is determined based at least in part on (e.g., by combining, such as averaging) all temporal event category scores in the $C_j$ for the jth timestep. Accordingly, a per-timestep reward measure for a defined timestep is generated based at least in part on each temporal event category score that is associated with a first category-timestep pair that is associated with: (i) one of those event categories that are in the unique m-sized subset for the defined timestep, and (ii) the defined timestep, while a per-timestep loss measure for a defined timestep is generated based at least in part on each temporal event category score that is associated with a second category-timestep pair that is associated with: (i) one of those event categories that are not in the unique m-sized subset for the defined timestep and, and (ii) the defined timestep.

In some embodiments, to generate the per-timestep reward measure for a jth defined timestep under a particular candidate intervention routine, all temporal event category scores in the $B_j$ for the jth timestep under the particular candidate intervention routine are processed by a per-timestep reward score aggregation machine learning model and the per-timestep reward measure for the jth timestep is determined based at least in part on the output of the noted processing. In some embodiments, to generate the per-timestep loss measure for a jth defined timestep under a particular candidate intervention routine, all temporal event category scores in the $C_j$ for the jth timestep under the particular candidate intervention routine are processed by a per-timestep loss score aggregation machine learning model and the per-timestep loss measure for the jth timestep is determined based at least in part on the output of the noted processing.

In some embodiments, because a candidate intervention routine assigns a unique set of m event categories to each defined timestep, this ensures that different sets of event categories are selected for intervention during different timesteps (e.g., different sets of pharmacies are selected for audit during different months), which in turn ensures that a degree of exploration of the set of c event categories is enforced in determining optimal intervention routines, which helps enforce an exploration-exploitation traversal of the c event categories across the d defined timesteps.

In some embodiments, because a candidate intervention routine assigns d per-timestep reward measures for the d defined timesteps, the d per-timestep reward measures may be combined (e.g., averaged) to generate a candidate intervention routine reward measure for the candidate intervention routine. In some embodiments, the d per-timestep reward measures defined by a candidate intervention routine are processed using a reward measure aggregation machine learning model and the candidate intervention routine reward measure for the candidate intervention routine is determined based at least in part on the output of the noted processing.

In some embodiments, because a candidate intervention routine assigns d per-timestep loss measures for the d defined timesteps, the d per-timestep loss measures may be combined (e.g., averaged) to generate a candidate intervention loss reward measure for the candidate intervention routine. In some embodiments, the d per-timestep loss measures defined by a candidate intervention routine are processed using a loss measure aggregation machine learning model and the candidate intervention routine loss measure for the candidate intervention routine is determined based at least in part on the output of the noted processing.

In some embodiments, the intervention recommendation reinforcement learning machine learning model is a reinforcement learning machine model that is configured to select an optimal intervention routine via maximizing the candidate intervention routine reward measures for the candidate intervention routines and minimizing the candidate intervention routine loss measures for the candidate intervention routines. In some embodiments, the intervention recommendation reinforcement learning machine learning model is configured to: (i) determine a candidate intervention routine utility measure for each candidate intervention routine by combining (e.g., averaging, summing, and/or the like) the candidate intervention routine reward measure for the candidate intervention routine and minimizing the candidate intervention routine loss measure for the candidate intervention routine, and (ii) selecting the optimal intervention routine as the candidate intervention routine having the highest candidate intervention routine utility measure. In some embodiments, maximizing the candidate intervention routine reward measure and minimizing the candidate intervention routine loss measure is performed using a dual optimization routine that enforces an exploration-exploitation traversal of the c event categories across the plurality of timesteps. In some embodiments, enforcing an exploration-exploitation traversal of the c event categories is determined by using at least some of the techniques that are described in Jalali et al., *Exploration vs Exploitation in Bayesian Optimization* (2013), available online at https://arxiv.org/abs/1204.0047v1.

At step/operation 704, the predictive data analysis computing entity 106 determines optimal intervention operations for each defined timestep based at least in part on the optimal intervention routine and the per-intervention temporal event category scores for the category-timestep pairs that are associated with the per-intervention temporal event category scores. In some embodiments, the optimal intervention operations for each jth defined timestep describes: (i) which m assigned event categories should be subject to intervention during the jth defined timestep, and (ii) for each kth assigned event category of the m assigned event categories, which intervention operations should be performed during the jth timestep as determined based at least in part on the intervention category that is associated with a highest per-intervention temporal event category score among the i per-intervention temporal event category scores that are associated with the category-timestep pair for the jth timestep and the kth assigned event category.

As described above, the optimal intervention routine is a selected candidate intervention routine, and thus may assign a unique m-sized subset of c event categories to each timestep of d timesteps. Accordingly, in some embodiments, the predictive data analysis computing entity 106 may first, such that, during each jth timestep that is associated with a unique m-sized subset of c event categories, m sets of intervention operations should be performed, each intervention operation set being performed with respect to a respective one of the m event categories in the unique m-sized subset for the jth timestep. For example, if m=1, and a first timestep (e.g., a first month) is assigned a pharmacy P3 by the optimal intervention routine, then an intervention operation set should be performed that includes performing intervention operations with respect to the pharmacy P3.

In some embodiments, once the predictive data analysis computing entity 106 determines which target event categories (e.g., which pharmacies) should be subject to intervention (e.g., audit) during a jth timestep (e.g., a jth month of the year), then predictive data analysis computing entity 106 determines what type of intervention (e.g., what type of audit) should be performed for each target event category during the jth timestep. For example, if m=1, and a first timestep (e.g., a first month) is assigned a pharmacy P3 by the optimal intervention routine, then an intervention operation set should be performed that includes performing intervention operations with respect to the pharmacy P3. In this example, the predictive data analysis computing entity 106 should determine what type of intervention to perform with respect to the pharmacy P3 during the first month.

In some embodiments, to determine the intervention type for a kth target event category that is in unique m-sized subset of c event categories for a jth timestep as defined by the optimal intervention, the predictive data analysis computing entity 106: (i) identifies the event-timestep pair that is associated with the kth target event category and the jth timestep, (ii) identifies the i per-intervention temporal event category scores for the identified event-timestep pair, where each per-intervention temporal event category score is associated with a corresponding intervention category (e.g., audit type) of i intervention categories, (iii) identifies the highest per-intervention temporal event category score of the i per-intervention temporal event category scores for the identified event-timestep pair, (iv) identifies the intervention category of the i intervention categories that is associated with the highest per-intervention temporal event category score, and (v) adopts the identified intervention category as the intervention type for the kth target event category and the jth timestep. Then, the predictive data analysis computing entity 106 may combine all m intervention types for the m target event categories that are associated with the jth timestep to generate an m-sized per-timestep intervention type set for the defined timestep based at least in part on each intervention type.

In some embodiments, to determine the intervention type for a kth target event category that is in unique m-sized subset of c event categories for a jth timestep as defined by the optimal intervention, the predictive data analysis computing entity 106: (i) identifies the event-timestep pair that is associated with the kth target event category and the jth timestep, (ii) identifies the i per-intervention temporal event category scores for the identified event-timestep pair, where each per-intervention temporal event category score is associated with a corresponding intervention category (e.g., audit type) of i intervention categories, (iii) removes z of the i per-intervention temporal category scores that are associated with intervention categories excluded by external configuration data (e.g., external configuration data describing regulatory considerations), (iv) identifies the highest per-intervention temporal event category score of the i-z per-intervention temporal event category scores for the identified event-timestep pair, (iv) identifies the intervention category of the i-z intervention categories that is associated with the highest per-intervention temporal event category score, and (v) adopts the identified intervention category as the intervention type for the kth target event category and the jth timestep. Then, the predictive data analysis computing entity 106 may combine all m intervention types for the m target event categories that are associated with the jth timestep to generate an m-sized per-timestep intervention type set for the defined timestep based at least in part on each intervention type.

At step/operation 705, the predictive data analysis computing entity 106 performs one or more prediction-based actions based at least in part on the intervention operation sets determined at step/operation 704. Examples of prediction-based actions include performing automated operations corresponding to the intervention operation sets determined at step/operation 704, generating audiovisual notifications corresponding to the intervention operation sets determined at step/operation 704, performing operational load balancing operations for intervention servers that are configured to perform operations corresponding to the intervention operation sets determined at step/operation 704, and/or the like.

In some embodiments, performing the prediction-based actions comprises generating user interface data for a prediction output user interface that is configured to describe intervention operations for a set of event categories across a set of defined timesteps. An operational example of such a prediction output user interface 1000 is depicted in FIG. 10. As depicted in FIG. 10, the prediction output user interface 1000 describes the recommended event categories (i.e., pharmacies) 1002 for a selected timestep 1001. As further depicted in FIG. 10, the prediction output user interface 1000 describes, for each recommended event category 1002 of the selected timestep 1001, an intervention/audit type 1003.

Accordingly, as described below, various embodiments of the present invention address technical challenges related to efficiently performing exploration-exploitation traversal of an input space by using operations having a linear computational complexity. As described below, in some embodiments, because a candidate intervention routine assigns a unique set of m event categories to each defined timestep, this ensures that different sets of event categories are selected for intervention during different timesteps (e.g., different sets of pharmacies are selected for audit during different months), which in turn ensures that a degree of exploration of the set of c event categories is enforced in determining optimal intervention routines, which helps enforce an exploration-exploitation traversal of the c event categories across the d defined timesteps. In this way, various embodiments of the present invention are able to enable a reinforcement machine learning model to perform exploration-exploitation traversal of an input space by using assignment/mapping operations having a linear computational complexity. In this way, various embodiments of the present invention improve the computational efficiency of performing reinforcement machine learning.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for determining an optimal intervention routine for a plurality of defined timesteps, the computer-implemented method comprising:
   identifying, using one or more processors, a group of input events, wherein:
     each input event of the group of input events is associated with an event category of a plurality of event categories,
     each input event of the group of input events is associated with a defined timestep of the plurality of defined timesteps, and
     each input event of the group of input events is associated with an event score set of a plurality of event score sets that is determined based at least in part on one or more input event features associated with the input event and using an event scoring machine learning model;
   for each category-timestep pair of a plurality of category-timestep pairs that is associated with a particular event category of the plurality of event categories and a particular defined timestep of the plurality of defined timesteps, generating, using the one or more processors, a temporal event category score based at least in part on event score sets of the plurality of event score sets for a subset of the group of input events that are associated with the particular event category and the particular defined timestep;
   generating, using the one or more processors, the optimal intervention routine using an intervention recommendation reinforcement learning machine learning model, wherein:
     the optimal intervention routine is selected from a plurality of candidate intervention routines by the intervention recommendation reinforcement learning machine learning model via maximizing a candidate intervention routine reward measure and minimizing a candidate intervention routine loss measure,
     each candidate intervention routine of the plurality of candidate intervention routines assigns a unique m-sized subset of the plurality of event categories to each defined timestep of the plurality of defined timesteps,
     each candidate intervention routine of the plurality of candidate intervention routines is associated with a per-timestep reward measure for each defined timestep of the plurality of defined timesteps that is generated based at least in part on each temporal event category score that is associated with a first category-timestep pair of the plurality of category-timestep pairs that is associated with: (i) one of the plurality of event categories that are in the unique m-sized subset for the defined timestep, and (ii) the defined timestep,
     each candidate intervention routine of the plurality of candidate intervention routines is associated with a per-timestep loss measure for each defined timestep of the plurality of defined timesteps that is generated based at least in part on each temporal event category score that is associated with a second category-timestep pair that is associated with: (i) one of the plurality of event categories that are not in the unique m-sized subset for the defined timestep, and (ii) the defined timestep,
     the candidate intervention routine reward measure for a particular candidate intervention routine is generated based at least in part on each per-timestep reward measure for the particular candidate intervention routine, and
     the candidate intervention routine loss measure for a particular candidate intervention routine is generated based at least in part on each per-timestep loss measure for the particular candidate intervention routine; and
   performing, using the one or more processors, one or more prediction-based actions based at least in part on the optimal intervention routine.

2. The computer-implemented method of claim 1, wherein:
   each event score set of the plurality of event score sets comprises a categorical event score for each intervention category of a plurality of intervention categories,
   each intervention category of the plurality of intervention categories is associated with a categorical event scoring sub-model of a plurality of categorical event scoring sub-models of the event scoring machine learning model, and
   each categorical event scoring sub-model of the plurality of categorical event scoring sub-models is configured to generate, based at least in part on the one or more input event features associated with a particular input event, the categorical event score for the particular input event with respect to the intervention category that is associated with the categorical event scoring sub-model.

3. The computer-implemented method of claim 2, further comprising for each category-timestep pair of the plurality of category-timestep pairs that is associated with the particular event category and the particular defined timestep, determining, using the one or more processors, a plurality of per-intervention temporal event category scores for the plurality of intervention categories, wherein the per-intervention temporal event category score is determined based at least in part on all categorical event scores that are associated with the particular event category for the category-timestep pair, the particular defined timestep, and a corresponding intervention category.

4. The computer-implemented method of claim 3, wherein performing the one or more prediction-based actions comprises:
for each defined timestep of the plurality of defined timesteps:
identifying the unique m-sized subset for the defined timestep as defined by the optimal intervention routine,
for each event category of the plurality of event categories in the unique m-sized subset for the defined timestep as defined by the optimal intervention routine, determining an intervention type based at least in part on a highest-valued per-intervention temporal event category score of the plurality of per-intervention temporal event category scores for the category-timestep pair that is associated with the event category and the defined timestep, and
determining a per-timestep intervention type set for the defined timestep based at least in part on each intervention type of the plurality of intervention types; and
performing the one or more prediction-based actions by performing operations corresponding to each per-timestep target intervention set of a plurality of per-timestep target intervention sets.

5. The computer-implemented method of claim 3, wherein each temporal event category score for a particular category-timestep pair that is associated with the particular event category and the particular defined timestep is determined based at least in part on: (i) the plurality of per-intervention temporal event category scores for the particular category-timestep pair, and (ii) a total utility value for the particular category-timestep pair.

6. The computer-implemented method of claim 2, further comprising generating the event scoring machine learning model, comprising:
identifying a plurality of training events, wherein: (i) each training event of the plurality of training events is associated with one or more training event features and a plurality of intervention labels for the plurality of intervention categories, and (ii) each intervention label of the plurality of intervention labels describes one of an affirmative occurrence of a corresponding intervention category with respect to the training event, a negative occurrence of the corresponding intervention category with respect to the training event, or a non-occurrence of the corresponding intervention category with respect to the training event;
for each categorical event scoring sub-model of the plurality of categorical event scoring sub-models:
generating a sub-model training subset of the plurality of training events by excluding training events that are associated with intervention labels describing non-occurrence of the intervention category associated with the categorical event scoring sub-model from the plurality of training events; and
generating a sub-model training measure based at least in part on the sub-model training subset for the categorical event scoring sub-model;
generating a model training measure based at least in part on the corresponding sub-model training measure for each categorical event scoring sub-model of the plurality of categorical event scoring sub-models; and
generating the event scoring machine learning model by optimizing the model training measure.

7. The computer-implemented method of claim 6, wherein the model training measure is determined based at least in part on a tunable intervention significance parameter for each of the plurality of intervention categories.

8. The computer-implemented method of claim 1, wherein maximizing the candidate intervention routine reward measure and minimizing the candidate intervention routine loss measure is performed using a dual optimization routine that enforces an exploration-exploitation traversal of the plurality of event categories across the plurality of timesteps.

9. A system for determining an optimal intervention routine for a plurality of defined timesteps, the system comprising one or more processors and memory including program code, the memory and the program code configured to, with the one or more processors, cause the system to at least perform operations comprising:
identifying a group of input events, wherein:
each input event of the group of input events is associated with an event category of a plurality of event categories,
each input event of the group of input events is associated with a defined timestep of the plurality of defined timesteps, and
each input event of the group of input events is associated with an event score set of a plurality of event score sets that is determined based at least in part on one or more input event features associated with the input event and using an event scoring machine learning model;
for each category-timestep pair of a plurality of category-timestamp pairs that is associated with a particular event category of the plurality of event categories and a particular defined timestep of the plurality of defined timesteps, generating a temporal event category score based at least in part on event score sets of the plurality of event score sets for a subset of the group of input events that are associated with the particular event category and the particular defined timestep;
generating the optimal intervention routine using an intervention recommendation reinforcement learning machine learning model, wherein:
the optimal intervention routine is selected from a plurality of candidate intervention routines by the intervention recommendation reinforcement learning machine learning model via maximizing a candidate intervention routine reward measure and minimizing a candidate intervention routine loss measure,
each candidate intervention routine of the plurality of candidate intervention routines assigns a unique m-sized subset of the plurality of event categories to each defined timestep of the plurality of defined timesteps, each candidate intervention routine of the plurality of candidate intervention routines is associated with a per-timestep reward measure for each defined timestep of the plurality of defined timesteps that is generated based at least in part on each temporal event category score that is associated with a first category-timestep pair of the plurality of category-timestep pairs that is associated with: (i) one of the plurality of event categories that are in the unique m-sized subset for the defined timestep, and (ii) the defined timestep, each candidate intervention routine of the plurality of candidate intervention routines is associated with a per-timestep loss measure for each defined timestep of the plurality of defined timesteps that is generated based at least in part on each temporal event category score that is associated with a second category-timestep pair that is associated with: (i) one of the plurality of event categories that are not in the unique m-sized subset for the defined timestep, and (ii) the defined timestep, the candidate intervention routine reward measure for a particular candidate intervention routine is generated based at least in part on each per-timestep reward measure for the particular candidate intervention routine, and the candidate intervention routine loss measure for a particular candidate intervention routine is generated based at least in part on each per-timestep loss measure for the particular candidate intervention routine; and performing one or more prediction-based actions based at least in part on the optimal intervention routine.

10. The system of claim 9, wherein:

each event score set of the plurality of event score sets comprises a categorical event score for each intervention category of a plurality of intervention categories, each intervention category of the plurality of intervention categories is associated with a categorical event scoring sub-model of a plurality of categorical event scoring sub-models of the event scoring machine learning model, and each categorical event scoring sub-model of the plurality of categorical event scoring sub-models is configured to generate, based at least in part on the one or more input event features associated with a particular input event, the categorical event score for the particular input event with respect to the intervention category that is associated with the categorical event scoring sub-model.

11. The system of claim 10, wherein performing the one or more prediction-based actions comprises:

for each defined timestep of the plurality of defined timesteps:
  identifying the unique m-sized subset for the defined timestep as defined by the optimal intervention routine,
  for each event category of the plurality of event categories in the unique m-sized subset for the defined timestep as defined by the optimal intervention routine, determining an intervention type based at least in part on a highest-valued per-intervention temporal event category score of the plurality of per-intervention temporal event category scores for the category-timestep pair that is associated with the event category and the defined timestep, and determining a per-timestep intervention type set for the defined timestep based at least in part on each intervention type of the plurality of intervention types; and performing the one or more prediction-based actions by performing operations corresponding to each per-timestep target intervention set of a plurality of per-timestep target intervention sets.

12. The system of claim 11, wherein each temporal event category score for a particular category-timestep pair that is associated with the particular event category and the particular defined timestep is determined based at least in part on: (i) the plurality of per-intervention temporal event category scores for the particular category-timestep pair, and (ii) a total utility value for the particular category-timestep pair.

13. The system of claim 10, wherein the operations further comprise generating the event scoring machine learning model comprising:

identifying a plurality of training events, wherein: (i) each training event of the plurality of training events is associated with one or more training event features and a plurality of intervention labels for the plurality of intervention categories, and (ii) each intervention label of the plurality of intervention labels describes one of an affirmative occurrence of a corresponding intervention category with respect to the training event, a negative occurrence of the corresponding intervention category with respect to the training event, or a non-occurrence of the corresponding intervention category with respect to the training event;

for each categorical event scoring sub-model of the plurality of categorical event scoring sub-models:
  generating a sub-model training subset of the plurality of training events by excluding training events that are associated with intervention labels describing non-occurrence of the intervention category associated with the categorical event scoring sub-model from the plurality of training events; and
  generating a sub-model training measure based at least in part on the sub-model training subset for the categorical event scoring sub-model;

generating a model training measure based at least in part on the corresponding sub-model training measure for each categorical event scoring sub-model of the plurality of categorical event scoring sub-models; and generating the event scoring machine learning model by optimizing the model training measure.

14. The system of claim 13, wherein the model training measure is determined based at least in part on a tunable intervention significance parameter for each of the plurality of intervention categories.

15. The system of claim 10, wherein maximizing the candidate intervention routine reward measure and minimizing the candidate intervention routine loss measure is performed using a dual optimization routine that enforces an exploration-exploitation traversal of the plurality of event categories across the plurality of timesteps.

16. A computer program product for determining an optimal intervention routine for a plurality of defined timesteps, the computer program product comprising at least one non-transitory computer-readable storage medium having computer-readable program code portions stored therein, the computer-readable program code portions configured to perform operations comprising:

identifying a group of input events, wherein:
- each input event of the group of input events is associated with an event category of a plurality of event categories,
- each input event of the group of input events is associated with a defined timestep of the plurality of defined timesteps, and
- each input event of the group of input events is associated with an event score set of a plurality of event score sets that is determined based at least in part on one or more input event features associated with the input event and using an event scoring machine learning model;

for each category-timestep pair of a plurality of category-timestep pairs that is associated with a particular event category of the plurality of event categories and a particular defined timestep of the plurality of defined timesteps, generating a temporal event category score based at least in part on event score sets of the plurality of event score sets for a subset of the group of input events that are associated with the particular event category and the particular defined timestep;

generating the optimal intervention routine using an intervention recommendation reinforcement learning machine learning model, wherein:
- the optimal intervention routine is selected from a plurality of candidate intervention routines by the intervention recommendation reinforcement learning machine learning model via maximizing a candidate intervention routine reward measure and minimizing a candidate intervention routine loss measure,
- each candidate intervention routine of the plurality of candidate intervention routines assigns a unique m-sized subset of the plurality of event categories to each defined timestep of the plurality of defined timesteps,
- each candidate intervention routine of the plurality of candidate intervention routines is associated with a per-timestep reward measure for each defined timestep of the plurality of defined timesteps that is generated based at least in part on each temporal event category score that is associated with a first per-category-timestep pair of the plurality of category-timestep pairs that is associated with: (i) one of the plurality of event categories that are in the unique m-sized subset for the defined timestep, and (ii) the defined timestep,
- each candidate intervention routine of the plurality of candidate intervention routine is associated with a per-timestep loss measure for each defined timestep of the plurality of defined timesteps that is generated based at least in part on each temporal event category score that is associated with a second category-timestep pair that is associated with: (i) one of the plurality of event categories that are not in the unique m-sized subset for the defined timestep, and (ii) the defined timestep,
- the candidate intervention routine reward measure for a particular candidate intervention routine is generated based at least in part on each per-timestep reward measure for the particular candidate intervention routine, and
- the candidate intervention routine loss measure for a particular candidate intervention routine is generated based at least in part on each per-timestep loss measure for the particular candidate intervention routine; and performing one or more prediction-based actions based at least in part on the optimal intervention routine.

17. The computer program product of claim 16, wherein:
- each event score set of the plurality of event score sets comprises a categorical event score for each intervention category of a plurality of intervention categories,
- each intervention category of the plurality of intervention categories is associated with a categorical event scoring sub-model of a plurality of categorical event scoring sub-models of the event scoring machine learning model, and
- each categorical event scoring sub-model of the plurality of categorical event scoring sub-models is configured to generate, based at least in part on the one or more input event features associated with a particular input event, the categorical event score for the particular input event with respect to the intervention category that is associated with the categorical event scoring sub-model.

18. The computer program product of claim 17, wherein performing the one or more prediction-based actions comprises:
- for each defined timestep of the plurality of defined timesteps:
  - identifying the unique m-sized subset for the defined timestep as defined by the optimal intervention routine,
  - for each event category of the plurality of event categories in the unique m-sized subset for the defined timestep as defined by the optimal intervention routine, determining an intervention type based at least in part on a highest-valued per-intervention temporal event category score of the plurality of per-intervention temporal event category scores for the category-timestep pair that is associated with the event category and the defined timestep, and
  - determining a per-timestep intervention type set for the defined timestep based at least in part on each intervention type of the plurality of intervention types; and
- performing the one or more prediction-based actions by performing operations corresponding to each per-timestep target intervention set of a plurality of per-timestep target intervention sets.

19. The computer program product of claim 18, wherein each temporal event category score for a particular category-timestep pair that is associated with the particular event category and the particular defined timestep is determined based at least in part on: (i) the plurality of per-intervention temporal event category scores for the particular category-timestep pair, and (ii) a total utility value for the particular category-timestep pair.

20. The computer program product of claim 17, wherein the operations further comprise generating the event scoring machine learning model comprising:
- identifying a plurality of training events, wherein: (i) each training event of the plurality of training events is associated with one or more training event features and a plurality of intervention labels for the plurality of intervention categories, and (ii) each intervention label of the plurality of intervention labels describes one of an affirmative occurrence of a corresponding intervention category with respect to the training event, a negative occurrence of the corresponding intervention category with respect to the training event, or a non-occurrence of the corresponding intervention category with respect to the training event;

for each categorical event scoring sub-model of the plurality of categorical event scoring sub-models:

generating a sub-model training subset of the plurality of training events by excluding training events that are associated with intervention labels describing non-occurrence of the intervention category associated with the categorical event scoring sub-model from the plurality of training events; and generating a sub-model training measure based at least in part on the sub-model training subset for the categorical event scoring sub-model;

generating a model training measure based at least in part on the corresponding sub-model training measure for each categorical event scoring sub-model of the plurality of categorical event scoring sub-models; and generating the event scoring machine learning model by optimizing the model training measure.

* * * * *